(12) United States Patent
Miyazaki et al.

(10) Patent No.: US 8,010,596 B2
(45) Date of Patent: Aug. 30, 2011

(54) PORTABLE RECORD AND/OR REPRODUCING DEVICE, REPRODUCING METHOD, AND RECORDING/REPRODUCING METHOD

(75) Inventors: Shuichi Miyazaki, Chiba (JP); Yoshitaka Ukita, Tokyo (JP); Fumihiko Yoshii, Tokyo (JP); Shinichi Obata, Saitama (JP); Masahiko Fujiyoshi, Chiba (JP); Masayuki Chiba, Iwate-Ken (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/635,739

(22) Filed: Dec. 7, 2006

(65) Prior Publication Data

US 2007/0100935 A1     May 3, 2007

Related U.S. Application Data

(63) Continuation of application No. 09/868,029, filed as application No. PCT/JP00/08019 on Nov. 14, 2000.

(30) Foreign Application Priority Data

Nov. 14, 1999 (JP) .................................. P11-361435

(51) Int. Cl.
*G06F 15/16* (2006.01)
*G11B 21/12* (2006.01)
(52) U.S. Cl. ...................... 709/203; 369/29.02; 345/184
(58) Field of Classification Search ............... 369/29.02; 709/203, 224; 345/184
See application file for complete search history.

(56) References Cited

U.S. PATENT DOCUMENTS

| | | | |
|---|---|---|---|
| 4,081,850 A | | 3/1978 | Walden |
| 4,504,707 A | * | 3/1985 | Ochiai ........................ 200/43.17 |
| 4,815,066 A | * | 3/1989 | Horvath .......................... 369/79 |
| 4,951,691 A | | 8/1990 | Leary |
| 5,230,649 A | | 7/1993 | Robertson |
| 5,323,370 A | * | 6/1994 | Davison et al. ................. 369/63 |
| 5,458,277 A | | 10/1995 | Wyzykowski |
| 5,491,774 A | * | 2/1996 | Norris et al. ................... 704/270 |
| 5,644,557 A | | 7/1997 | Akamine et al. |
| 5,778,314 A | * | 7/1998 | Sudo et al. ................. 455/412.1 |
| 5,787,399 A | * | 7/1998 | Lee et al. ....................... 704/270 |
| 5,915,609 A | * | 6/1999 | Diakoulas ..................... 224/626 |
| 6,036,068 A | | 3/2000 | Cartmell |

(Continued)

FOREIGN PATENT DOCUMENTS

EP          0957489 A1 *  11/1998

(Continued)

*Primary Examiner* — Tonia L Dollinger
*Assistant Examiner* — Asghar Bilgrami
(74) *Attorney, Agent, or Firm* — Lerner, David, Littenberg, Krumholz & Mentlik, LLP

(57) ABSTRACT

A reproducing means for performing reproduction processing on digital data which is read out from a predetermined recording medium recording the digital data, a manipulating means for making an instruction of reproducing the digital data inserted in the recording medium, a control means for reading the digital data from the recording medium in accordance with the reproduction instruction input with the manipulating means and sending it to the reproducing means, and for controlling the reproducing means to perform reproduction processing on the digital data, and a cylindrical case for containing the reproducing means and the control means are provided, and wherein the manipulating means is provided on one end side on one plane in the longitudinal direction of the cylindrical case. Thereby the user can manipulate the manipulating means without taking out a portable recording and/or reproducing device from a bag or a pocket, thus making it possible to remarkably improve its manipulation.

15 Claims, 31 Drawing Sheets

U.S. PATENT DOCUMENTS

| | | | |
|---|---|---|---|
| 6,038,199 A * | 3/2000 | Pawlowski et al. | 369/29.02 |
| 6,084,776 A | 7/2000 | Cuntz et al. | |
| 6,167,251 A * | 12/2000 | Segal et al. | 455/406 |
| 6,226,618 B1 | 5/2001 | Downs et al. | |
| 6,353,870 B1 * | 3/2002 | Mills et al. | 710/301 |
| 2001/0006503 A1 * | 7/2001 | Braitberg et al. | 369/77.2 |

FOREIGN PATENT DOCUMENTS

| | | | |
|---|---|---|---|
| EP | 000957489 A1 * | 11/1998 | |
| GB | 2247494 A * | 3/1992 | |
| JP | 33-010756 | 7/1933 | |
| JP | 63-020485 | 1/1988 | |
| JP | 01-206732 | 8/1989 | |
| JP | 02-084388 | 3/1990 | |
| JP | 05-093091 | 4/1993 | |
| JP | 05-283876 | 10/1993 | |
| JP | 9-065473 A | 3/1997 | |
| JP | 9-179594 A | 7/1997 | |
| JP | 9-191916 A | 7/1997 | |
| JP | 1997-179594 * | 9/1997 | |
| JP | 10-283080 A | 10/1998 | |
| JP | 200148190 A * | 11/1998 | |
| JP | 11-509977 | 8/1999 | |
| JP | 3048035 B2 | 3/2000 | |
| JP | 2000148190 A * | 5/2000 | |
| KR | 601620 B1 * | 10/1999 | |

* cited by examiner

PORTABLE RECORD AND/OR REPRODUCING DEVICE, REPRODUCING METHOD, AND RECORDING/REPRODUCING METHOD

CROSS-REFERENCE TO RELATED APPLICATIONS

This application is a Continuation of U.S. application Ser. No. 09/868,029, filed on Sep. 23, 2002, the disclosure of which is incorporated herein by reference.

TECHNICAL ART

The present invention relates to a portable recording and/or reproducing device, reproducing method, and recording/reproducing method, and more particularly, is suitably applicable to a portable digital reproducing device which can reproduce music data.

BACKGROUND ART

Recently, portable digital reproducing devices have been proposed, which record music data in a built-in semiconductor memory, and reproduce the music data from the semiconductor memory.

By the way, the portable digital reproducing devices are brought in bags, or in pockets of jackets.

However, when such a portable digital reproducing device is carried, a manipulating part provided on the portable digital reproducing device is hidden in the bag or the pocket of a jacket, which causes a bothering problem in which the digital reproducing device has to be taken from the bag or the pocket of the jacket every time when music data is reproduced by manipulating the manipulating part.

DISCLOSURE OF THE INVENTION

The present invention has been made in view of the above point, and proposes a portable unit of which the manipulation can be remarkably improved.

To solve the above problem, the present invention prepares: a reproducing means for performing reproducing processing on digital data which is read out from a predetermined recording medium recording the digital data; a manipulating means for making an order of reproducing the digital data recorded on a recording medium; a control means for reading the digital data from the recording medium in response to the reproduction order which is input with the manipulating means and sending it to the reproducing means and for controlling the reproducing means so as to perform the reproducing processing on the digital data; and a cylindrical housing case which contains the reproducing means and the control means. In addition, the manipulating means is provided on a surface of one end side with respect to a longitudinal direction of the cylindrical housing case.

As a result, the user can manipulate the operation part without taking out the portable recording and/or reproducing device from the bag or the pocket, thus making it possible to remarkably make the manipulation easy.

BEST MODE FOR CARRYING OUT THE INVENTION

One embodiment of the present invention will be described in detail hereinafter with reference to the drawings.

Utilization of Electronic Music Distribution Service

Recently, an electronic music distribution service called EMD (Electronic Music Distribution) for distributing digital music contents using a computer network on Internet has been proposed.

Figure 1:
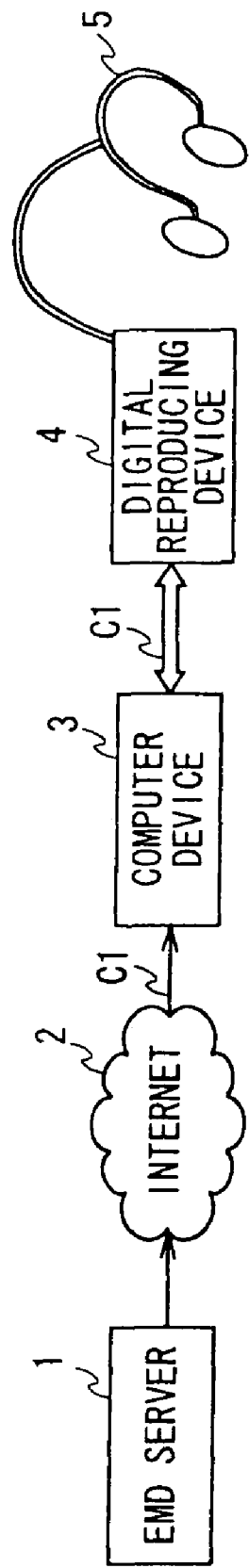
FIG. 1 is a block diagram explaining the utilization of digital music contents.

As shown in FIG. 1, in this kind of electronic music distribution service, digital music contents C1 is distributed from an EMD server 1 for supplying contents, to a personal computer (hereinafter, referred to as a computer device) 3 at home on Internet 2.

In the computer device 3, the digital music contents C1 distributed from the EMD server 1 is downloaded in a built-in hard disk to be reproduced in accordance with user's operation, so that the user can listen to the music at any time.

Such an electronic music distribution service has two kinds of purchase methods. One is called "purchase" in which the digital music contents C1 downloaded from the EMD server 1 in the computer device 3 can be reproduced anytime again and again, just like_ a CD (Compact Disc). The other is a new method and is called "with reproduction limitation" in which the reproducible term or the reproducible number of times is limited in stead of a low-cost service.

Thus, when an user purchases the digital music contents C1 from the EMD server 1 with "with reproduction limitation", the user can reproduce the purchased digital music contents C1 within the limited term or the limited number of times with the computer device 3.

Further, the computer device 3 connects to the portable digital reproducing device 4 internally having a non-volatile semiconductor flash memory as a storing means, with a USB (Universal Serial Bus) cable. Thereby, the digital music contents C1 can be uploaded through the USB cable in the semiconductor flash memory of the digital reproducing device 4 as digital data.

Thus, the user can reproduce the digital music contents C1 with "with reproduction limitation", within the reproducible term and reproducible number of times with the digital reproducing device 4, as well as with the computer device 3. Therefore, the user can casually listen to high-sound-quality music through a headphone 5, even outside.

Actually, as shown in FIG. 2(A), the digital music contents C1 with "with reproduction limitation" downloaded from the EMD server 1 in the computer device 3 is composed of a header H1 and music data Dl integratedly. The header H1 includes various information relating to the reproduction limitation such as the reproducible term, the reproducible number of times, and the number of times of actual reproduction (hereinafter, referred to as real reproduced number of times).

Next, as shown in FIG. 2(B), the computer device 3 uploads the digital music contents C1 in the semiconductor flash memory of the digital reproducing device 4 as digital data.

The digital reproducing device 4, when executing reproduction processing in accordance with the reproduction operation by an user, always reproduces the music data D1 after reading out the reproduction limitation information in the header H1, so as to effectively use the reproduction limitation information managed at the header H1 of the digital music contents C1 and to avoid indirect reproduction processing.

By the way, the digital reproducing device 4 according to this embodiment does not have a RTC circuit on board, and the reproducible term can not be managed by a Clock function. Thereby, even if the reproduction limitation information in the header H1 is read out, it can not be judged whether or not it is within the reproducible term, and as a result, the digital music contents C1 may be repeatedly reproduced without limitation.

To prevent such unlimited reproduction of the digital music contents C1, the digital reproducing device 4 permits an user to reproduce the digital music contents C1 only within "reproducible number of times (e.g., twice)" prescribed by the reproduction limitation information in the header H1, even within the reproducible term. When "real reproduced number of times" which is renewed every actual reproduction reaches "reproducible number of times", the digital reproducing device 4 makes a protection such as the limitation of the reproduction processing.

However, this limitation allows the reproduction only twice regardless of within the reproducible term. This is the reason why the digital reproducing device 4 access the computer device 3 again to receive the current time information T1 from the RTC circuit 3A built in the computer device 3, decides based on the time information T1 whether or not it is within the reproducible term, and rewrite the "real reproduced number of times" in the header Hl to "0" when it is within the reproducible term, as shown in FIG. 2(C).

Thereby, the digital reproducing device 4, when it is within the reproducible term, repeatedly uses the limitation of "reproducible number of times (e.g., twice)" prescribed by the reproduction limitation information in the header H1, to execute the above-described reproduction processing again and again.

On the other hand, when it is recognized based on the time information T1 that the term expires, the digital reproducing device 4 does not rewrite "reproduced number of times" of the header Hl to "0" and does not execute the reproduction processing.

In this way, the digital reproducing device 4 repeatedly checks "the reproducible number of times" for the reproduction processing and the reproducible term by accessing the computer device 3, so that the reproduction processing can be executed again and again until "reproducible number of times (twice)" within the reproducible term, and at the same time, the reproduction processing is limited when the reproducible term expires.

On the contrary, in the case of the digital music contents C1 with only the reproduction limitation of the reproducible number of times, the digital reproducing device 4 executes the reproduction processing within the reproducible number of times, and does not execute the reproduction processing after the digital music contents C1 has been reproduced for the reproducible number of times.

Figure 3:
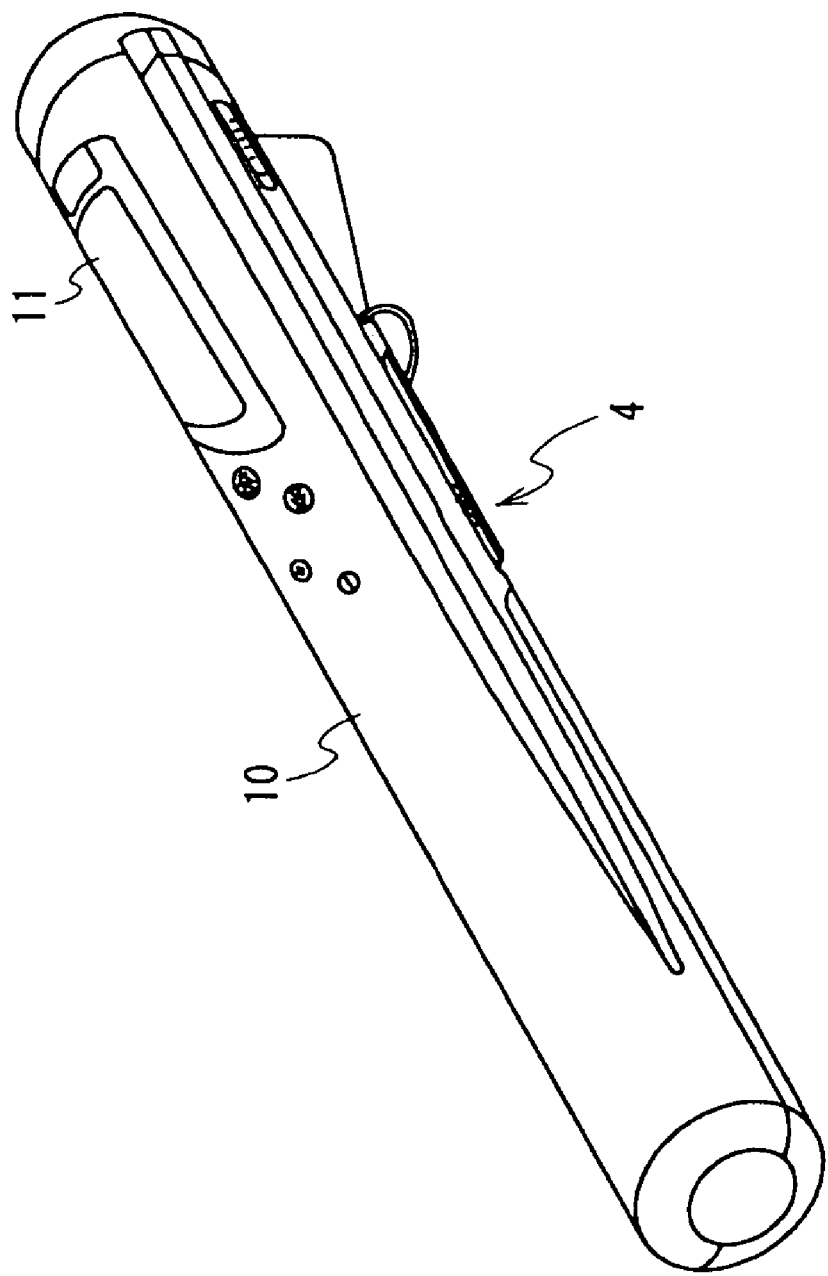
FIG. 3 is a brief linear oblique perspective view showing the constitution of the digital reproducing device according to this embodiment.

(2) Constitution of Whole Digital Reproducing Device (2-1) Constitution of Digital Reproducing Device As shown in FIG. 3, the digital reproducing device 4 has a housing case 10 of a nearly cylindrical shape. Disposed on the circumferential plane of the housing case 10 are various operating switches, operating buttons, and a display window 11 for display.

Here, assuming that the side where the display window 11 exists on the digital reproducing device 4 is the front, four kinds of circumferential planes which are considered by rotating the housing case every forty-five degrees centering the axis, will be described with reference to FIGS. 4(A) to 4(D).

Figure 4:
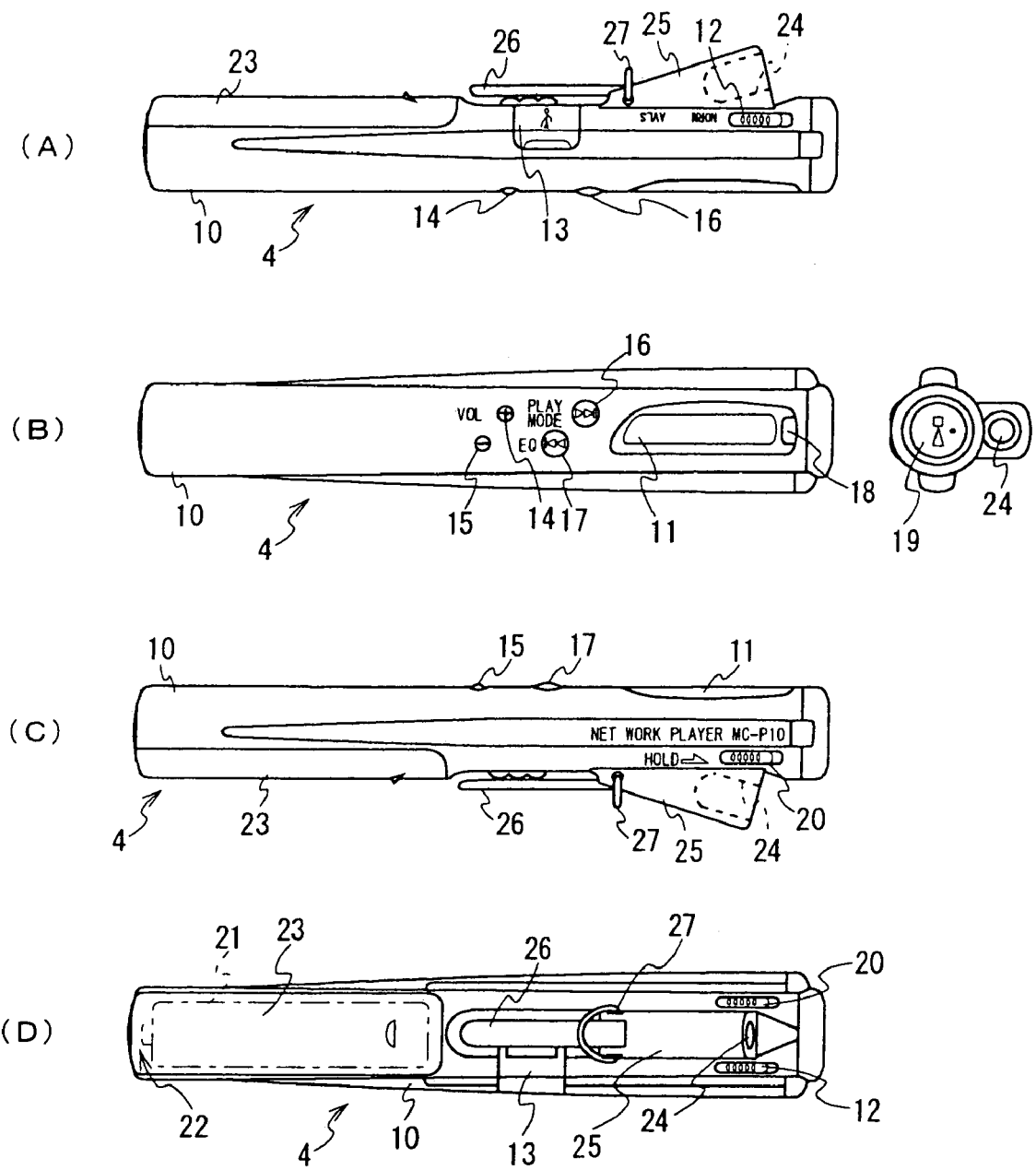
FIG. 4(A) is a left side view showing the constitution of the left side of the digital reproducing device.
FIG. 4(B) is a front view showing the constitution of the front of the digital reproducing device.
FIG. 4(C) is a right side view showing the constitution of the right side of the digital reproducing device.
FIG. 4(D) is a back view showing the constitution of the back of the digital reproducing device.

As shown in FIG. 4(A), at the left side plane of the housing case 10, a maximum volume fixing switch 12 for fixing the maximum of volume is provided slideably on one end side in the longitudinal direction (hereinafter, referred to as case longitudinal direction) of the housing case 10, and a plastic USB (Universal Serial Bus) connector cover 13 is provided to open and Close an opening part (not shown) in which a USB connector is contained.

Practically, the USB connector cover 13 protects the USB connector, by Closing the opening part so that the USB connector is integrated with the housing case 10 when the USB connector is not used. On the other hand, the USB connector cover 13 opens the opening part when the USB connector is used, so that the USB connector can connected to the computer device 3 with the USB cable (not shown).

Further, as shown in FIG. 4(B), on the front plane of the housing case 10, a volume up button 14, a volume down button 15, a forwarding button 16, a rewinding button 17, the display window 11, and a shift button 18 are successively provided between the nearly center and one end of the housing case 10. Moreover, on one plane of the housing case 10, a play/stop button 19 which can input reproduction instruction and stop instruction is provided.

Then, in the front of the housing case 10, a display (not shown) provided under the display window 11 displays in accordance with various operations, so that the display contents can be shown through the display window 11.

In this connection, when the forwarding button 16 is pressed while the shift button 18 is pressed, the shift button 18 functions as an operating button for changing the reproduction mode together with the forwarding button 16. Also, when the rewinding button 17 is pressed while the shift button 18 is pressed, the shift button 18 functions as an operating button for changing the sound quality mode together with the rewinding button 17.

Further, as shown in FIG. 4(C), on the right side plane of the housing case 10, a hold switch 20 is provided slidably at one end side. For example, the hold switch 20 is slid to one end side of the housing case 10 so as to invalidate the input from various operating buttons and keep the current state.

In addition to this, as shown in FIG. 4(D), on the back plane of the housing case 10, a dry battery containing part 22 which loads an AA-sized dry battery for driving 21 is provided at the other end side, and a cover part 23 for shutting-up the dry battery containing part 22 is removably fitted.

Thus, in the dry battery containing part 22, the cover part 23 is removed to load the dry battery for driving 21 therein or to take out the dry battery for driving 21 therefrom. Also, when the cover part 23 is fitted in such a state that the dry battery for driving 21 is inside, the cover part 23 prevents the dry battery for driving 21 from dropping out and holds it.

On the back plane of the housing case 10, a jack holding part 25 for holding a headphone jack 24 and a Clip part 26 for attaching the housing case 10 to the breast pocket, etc. are provided side by side in the longitudinal direction of the case on one end side. At an adjacent place between the jack holding part 25 and the Clip part 26, and at a predetermined position which is shifted from the center of gravity of the digital reproducing device 4, a ring-shaped strap fitting 27 is provided.

The strap fitting 27 can rotate freely within approximately 180 degrees, between the position in contact with the jack holding part 25 and the position in contact with the Clip part 26, on the back plane of the housing case 10. By holding the strap fitting 27 up, various straps can be fitted or removed easily.

Here, the digital reproducing device 4 is different from a recording/reproducing device having a mechanical recording/reproducing mechanism such as a hard disk drive, etc. and as described above in FIG. 1, the digital music contents C1 is recorded and reproduced in and from the internal semiconductor flash memory, so that the music data D1 of the digital music contents C1 can be reproduced without generation of sound jumping even under an environment marked by vibration.

Figure 5:
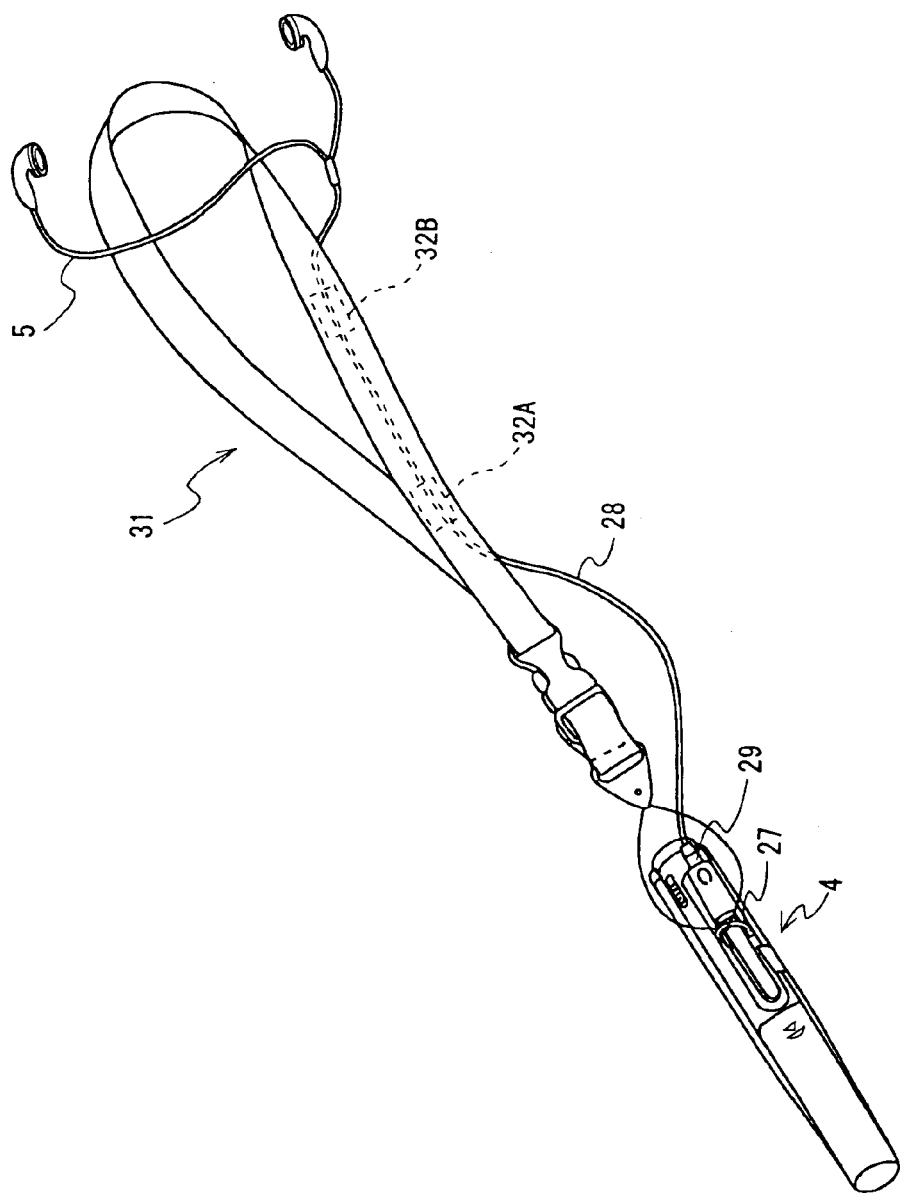
FIG. 5 is a schematic diagram explaining the digital reproducing device to which a dangling strap is attached.

On this account, in the digital reproducing device 4, as shown in FIG. 5, a plug 29 provided in a headphone code 28 is inserted into the headphone jack 24, so that the user can usually listen to analog audio obtained by reproducing the music data Dl from the semiconductor flash memory through the headphone 5.

At this time, a band-type dangling strap 31 is fitted to the strap fitting 27 so as to use the digital reproducing device which is dangled from user's neck.

By the way, the digital reproducing device 4 weighs about 25 [g], excepting a dry battery for driving 21. Most of various parts constituting the digital reproducing device 4 are provided on one end side in the longitudinal direction of the case. Also, since the digital reproducing device 4 loads the dry battery for driving 21 which weighs about 23 [g], for example, into the dry battery containing part 22 provided at the other end side in the longitudinal direction of the case, when the dry battery for driving 21 is loaded, the center of gravity is almost the center in the longitudinal direction of the case.

Figure 6:
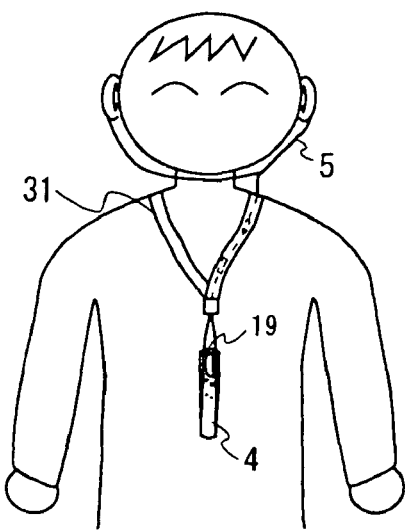
FIG. 6 is a schematic diagram explaining the digital reproducing device which is dangled from a user's neck by using the dangling strap.

Then, in the digital reproducing device 4, as shown in FIG. 6, when the dangling strap 31 is used to dangle the device 4 from user's neck, the fitting position, the fulcrum, of the strap fitting 27 is fixed a little to one end side from the center of gravity in the longitudinal direction of the case, so that the other end side of the housing case 10 orients toward the vertical down direction. Thus, the digital reproducing device 4 is maintained to have a position that a play/stop button 19, which is provided at one end side of the housing case 10, orients toward the vertical up direction.

Thereby, when the digital reproducing device 4 is dangled from user's neck, the user holds only the circumferential side plane of the housing case 10 with hands, and the user's thumb easily touches the play/stop button 19 for manipulation.

In this connection, in the digital reproducing device 4, as it is apparent from FIG. 5, guides 32A and 32B for passing and holding the headphone code 28 are provided on the dangling strap 31, which prevents the headphone code 28 from being twisted together when the digital reproducing device 4 is used with the dangling strap 31 dangled from user's neck.

Figure 7:
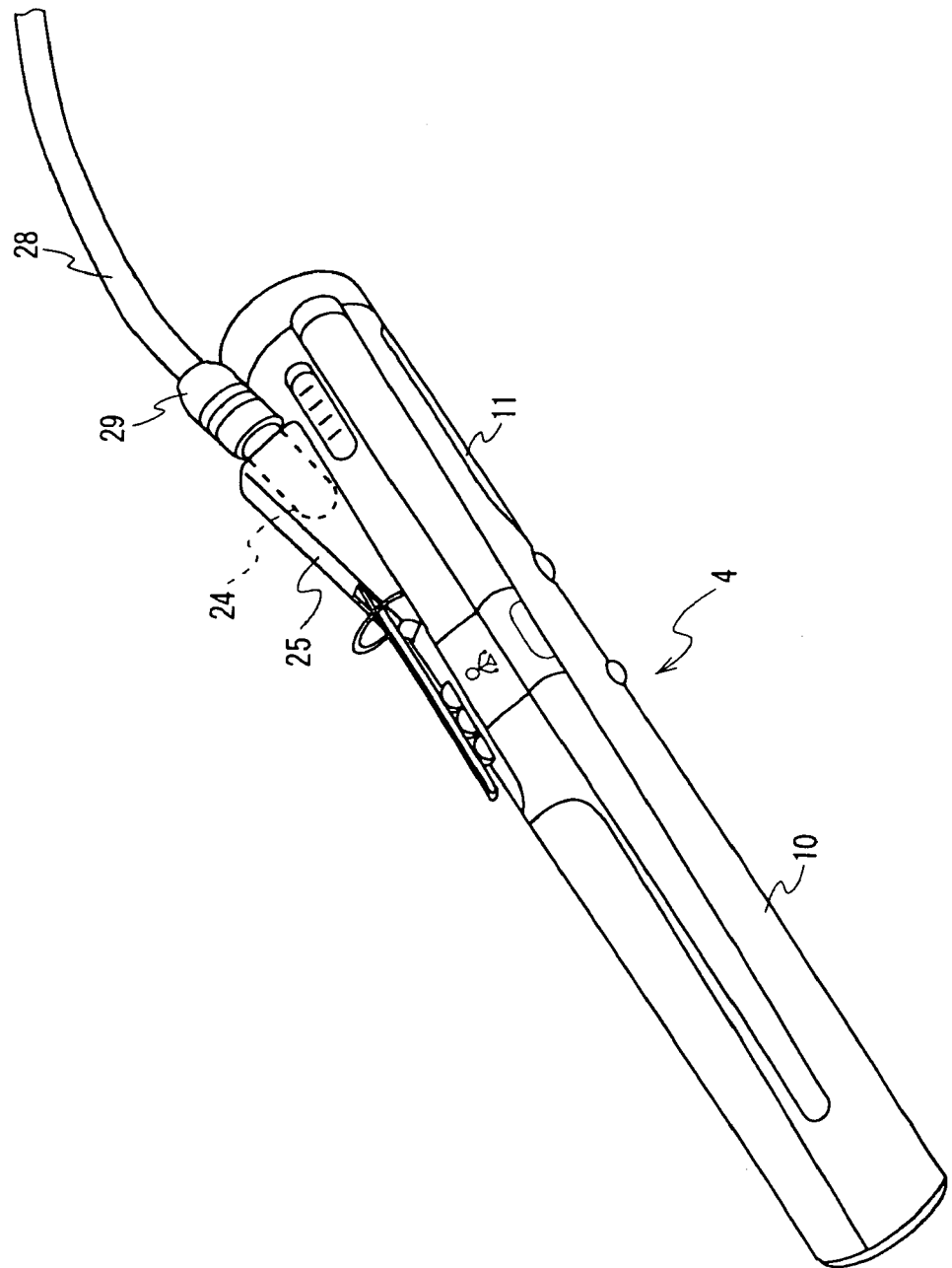
FIG. 7 is a brief linear oblique perspective view explaining the insertion of the plug into a headphone jack.

Further, in the digital reproducing device 4, as shown in FIG. 7, the jack holding part 25 is formed in a wedge shape, and the headphone jack 24 is held in the jack holding part 25 in which the axis of the cylindrical plug inserting opening is inclined with respect to the longitudinal direction of the case.

Therefore, in the digital reproducing device 4, a plug 29 can be inserted into the headphone jack 24 from the inclined direction with respect to the longitudinal direction of the case. Thereby, the connection part between the plug 29 and the headphone code 28 is relatively distanced from the play/stop button 19, which prevents the connection part between the plug 29 and the headphone code 28 from obstructing the manipulation of the play/stop button 19.

Figure 8:
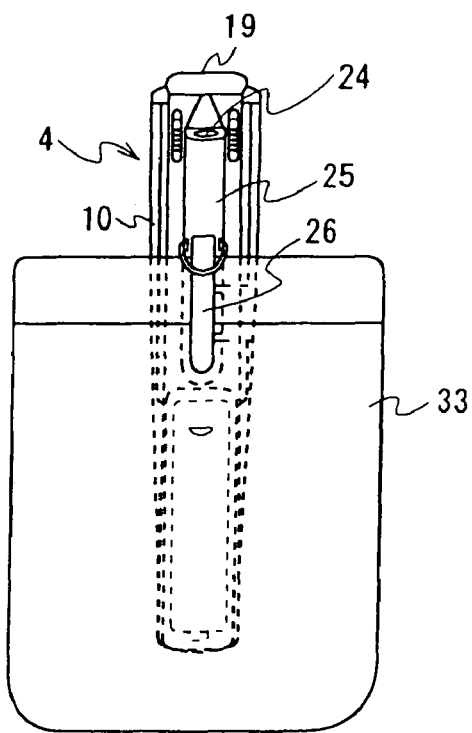
FIG. 8 is a schematic diagram explaining the digital reproducing device attached to a breast pocket.

In addition to this, in the digital reproducing device 4, as shown in FIG. 8, one end side of the platy Clip part 26 is supported by a supporting axis (not shown) provided into the jack holding part 25, and the other end side of the clip 26 is moved within a predetermined angle with respect to the back plane of the housing case 10.

Thereby, the digital reproducing device 4 can be attached to the breast pocket by sandwiching a breast pocket 33 between the back plane and the housing case 10 and the other end side of the clip part 26.

Then, also in the case that the digital reproducing device 4 is attached to the breast pocket 33, the play/stop button 19 is till out of the breast pocket 33. Thereby, this can prevent that the operationality of the play/stop button 19 becomes difficult.

Figure 9:
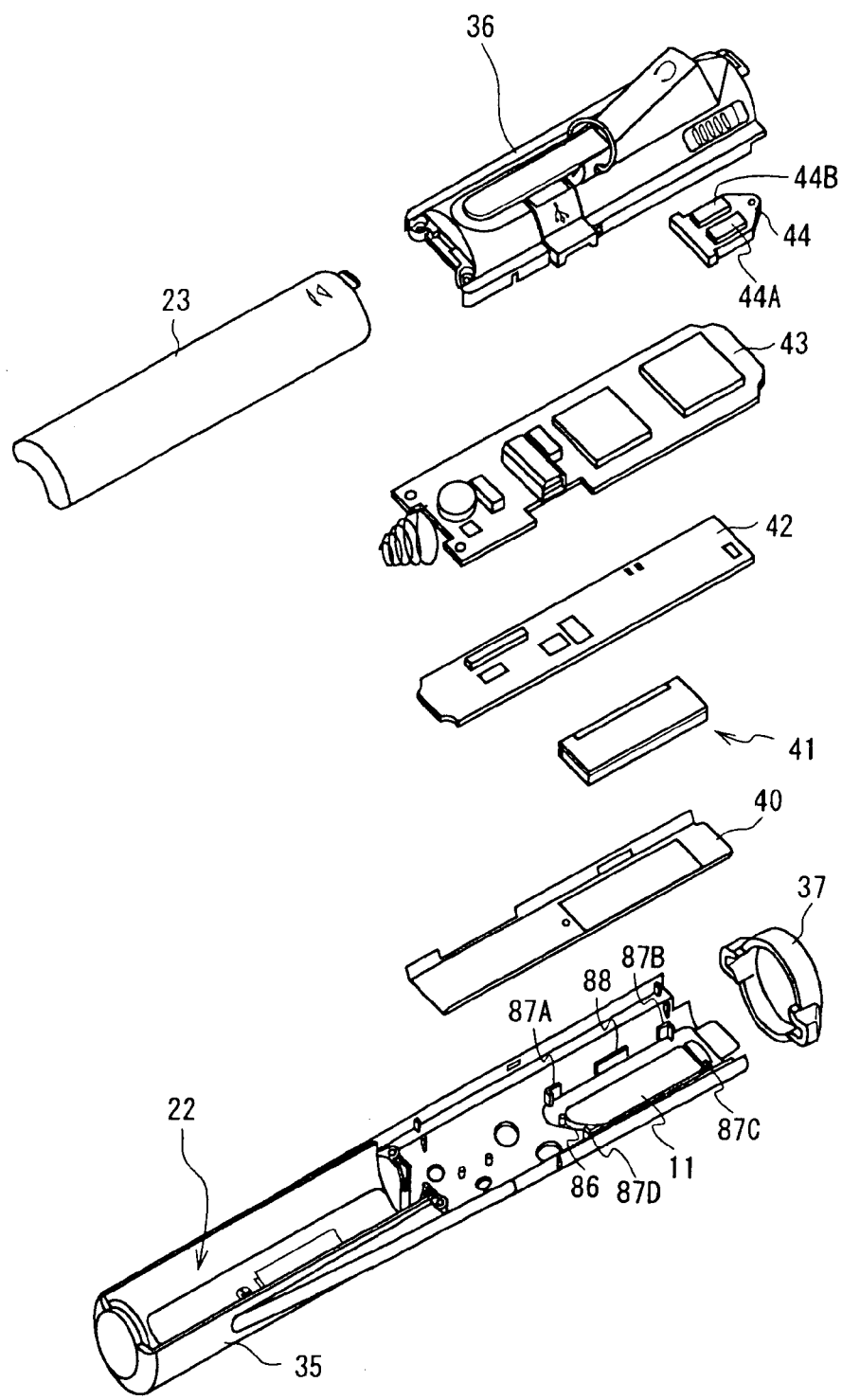
FIG. 9 is a brief-linearly exploded perspective view showing the internal construction of the digital reproducing device.

Here, as shown in FIG. 9, the housing case 10 is composed of a front side case 35 for covering the whole front side, from one end to the other end, a back side case 36 for covering one end side of the back plane, the cover part 23 for covering the other end side of the back plane, and a button holding part 37 for holding the play/stop button 19.

The front side case 35, the back side case 36, the cover part 23, and the button holding part 37 are made of synthetic resin which include PC (Polycarbonate) resin and ABS (Acrylonitrile Butadiene Styrene) resin at a predetermined ratio.

Then, the front side case 35 forms the dry battery containing part 22 described above in FIG. 4(D) at the other end side with the single member. Also, in the containing space between one end side of the front side case 35 and the back side case 36 are a display protecting member 40, a display 41, a sub circuit board 42, a main circuit board 43, and a switch circuit board 44 are laminated and contained in order. In this connection, the switch circuit board 44 is a flexible board on which switch circuit elements 44A and 44B for the maximum volume fixing switch 12 and the hold switch 20 are mounted, and is fixed in the back side case 36.

Figure 10:
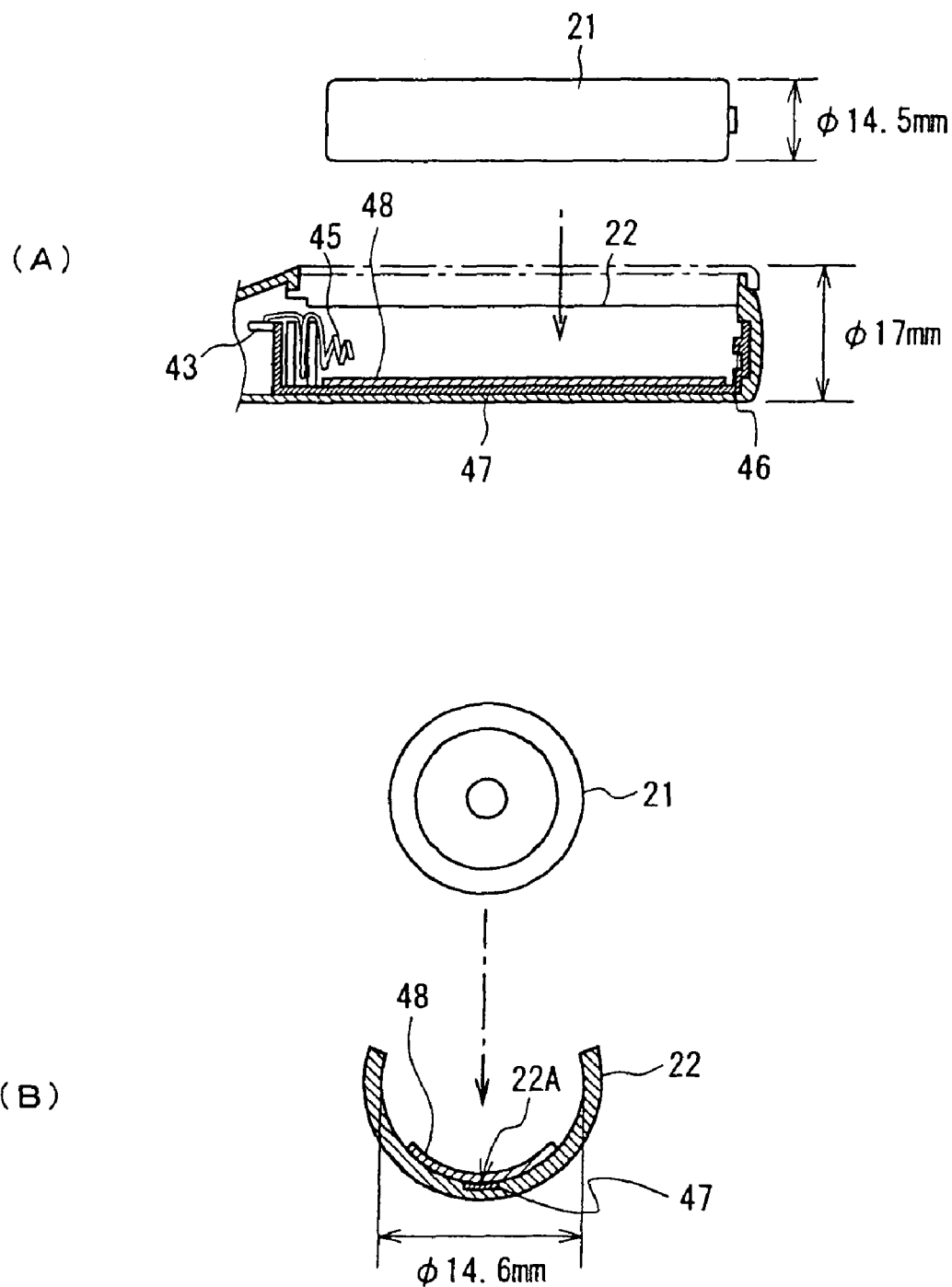
FIG. 10(A) is a schematic cross-sectional diagram showing the internal construction of a dry battery containing part.
FIG. 10(B) is a schematic cross-sectional diagram showing the accommodating of a conducting board in the dry battery containing part.

Practically, as shown in FIGS. 10(A) and 10(B), the dry battery containing part 22 has cylindrical containing space having the inside diameter which fits the outside diameter of the dry battery for driving 21. At one end in the longitudinal direction of the case, a negative electrode terminal 45 formed like a coil by a conductive wire is arranged. At the other end in the longitudinal direction of the case, a positive electrode terminal 46 formed like a disc by a conductive wire is arranged.

In this case, in the dry battery containing part 22, one end of the negative electrode terminal 45 is directly and electrically connected to the main circuit board 43, and the positive electrode terminal 46 is electrically connected to the main circuit board 43 with a disc-type conducting board 47 which is integrated with the positive electrode terminal 46.

Then, at the bottom of the dry battery containing part 22, a groove part 22A is formed through one end to the other end in the longitudinal direction of the case, and the conducting board 47 is fitted into the groove part 22A. The depth of the groove part 22A is selected in accordance with the thickness of the conducting board 47, about 0.2 [mm]. Thereby, the conducting board 47 is prevented from being projected from the internal plane of the dry battery containing part 22 into the containing space.

Further, at the bottom of the dry battery containing part 22, a sheet-type serial label 48 having a thickness of about 0.1 [mm] is adhered over the conducting board 47, from one end through the other end in the longitudinal direction of the case.

Figure 11:
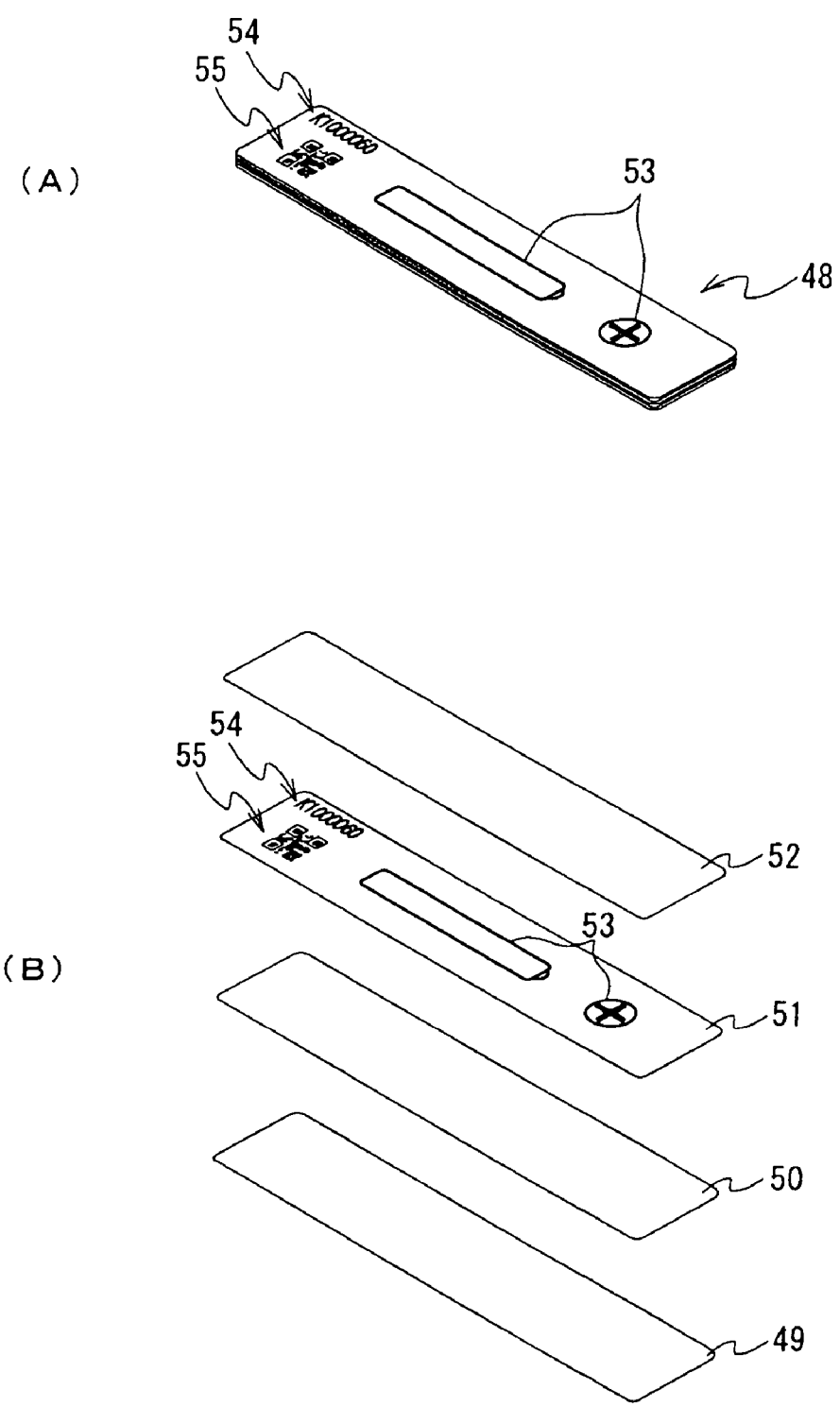
FIG. 11(A) is a brief linear perspective view showing the external appearance of a serial label.
FIG. 11(B) is a brief linearly exploded perspective view showing the construction of the serial label.

The serial label 48, as shown in FIGS. 11(A) and 11(B), is formed by successively laminating an acrylic pressure-sensitive adhesive layer 49 having a relatively strong adhesive power, an aluminum layer 50, an insulative resin layer for printing 51 made of PET (Polyethylene terephthalate), and a transparent film 52. The thickness of the aluminum layer 50 is suitably selected, so that the serial label 48 has a certain extent of hardness. Thereby, the serial label 48 can be prevented from damage such as break.

In this connection, in the serial label 48, pictures 53 showing the loading direction of the dry battery for driving 21, characters 54 showing the manufacturer's serial number of each digital reproducing device 4 on which the serial label 47 is adhered, and a two-dimensional bar code 55 are printed on the resin layer for printing 51. The transparent film 52 is laminated over the resin layer for printing 51 to protect the picture 53 and the characters 54.

Therefore, in the dry battery containing part 22 (FIGS. 10(A) and 10(B)), the strong adhesive power and hardness of the serial label 48 safeguards not to lift the conducting board 47 from the groove part 22A to damage the circumferential plane of the dry battery for driving 21. Simultaneously, the insulation of the serial label 48 insulates the conducting board 47 from the circumferential side plane of the dry battery for driving 21.

Then, in the dry battery containing part 22, the conducting board 47 is fitted into the groove part 22A, and the serial label 48 having a thickness of about 0.1 [mm] is used for insulation of the conducting board 47 and the circumferential side plane of the dry battery for driving 21, so that the inside diameter of the dry battery containing part 22 can be selected nearly the same as the outside diameter, about 14.5 [mm], of the dry battery for driving 21.

Further, in the dry battery containing part 22, the thickness is selected to protect the dry battery containing part 22 from damage, and the outside diameter of the dry battery containing part 22 is selected to nearly 17 [mm] in accordance with the inside diameter and the thickness, so that the whole device can be downsized entirely.

Figure 12:
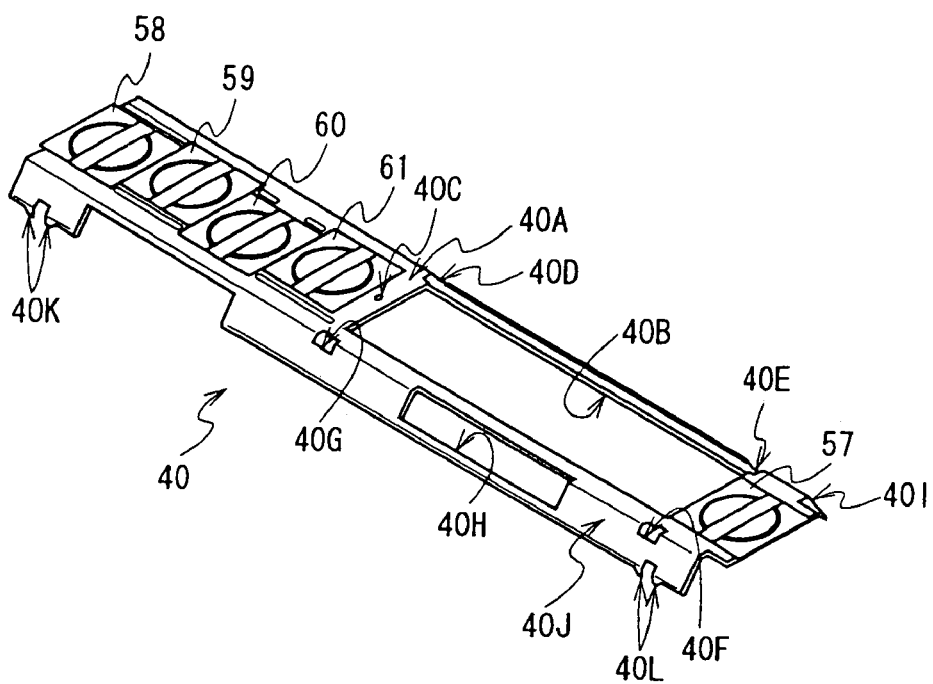
FIG. 12 is a brief linear oblique perspective view showing the construction of a display protecting member.

On the other hand, a display protecting member 40, as shown in FIG. 12, is formed by a conductive metal plate of which both ends in the width direction are bent. A switch element 57 of diaphragm constitution is arranged at one end of a flat part 40A corresponding to the shift button 18, and switch elements 58 to 61 of diaphragm constitution are arranged at the other end of the flat part 40A, respectively corresponding to the volume up button 14, the volume down button 15, the forwarding button 16, and the rewinding button 17.

Further, on the flat part 40A, an opening part 40B corresponding to the display 41 is provided between the switch element 57 at one end and the switch elements 58 to 61 at the other end.

Figure 13:
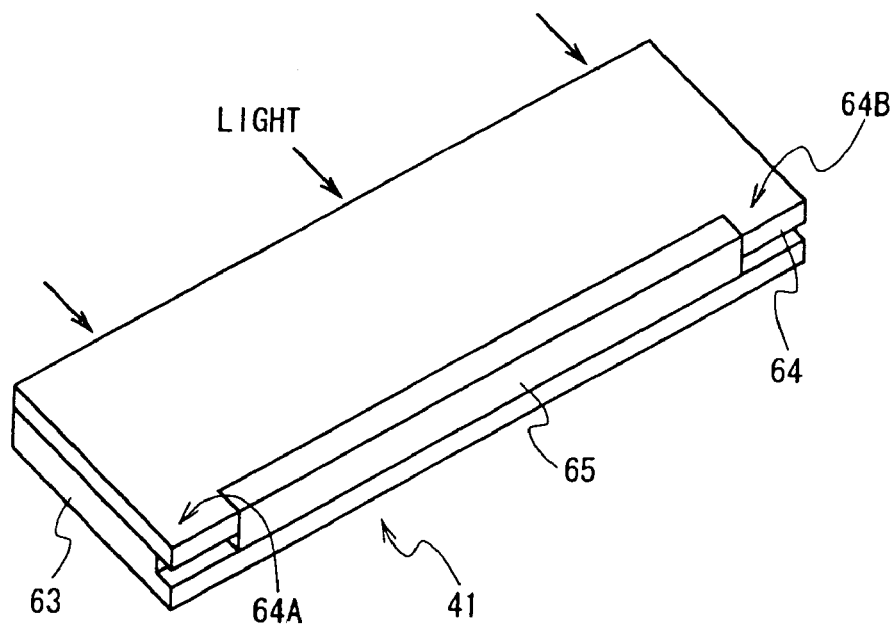
FIG. 13 is a brief linear oblique perspective view showing the construction of the display.

In the display 41, as shown in FIG. 13, a light conducting plate 64 having a concave part at one side is laminated on the LCD (Liquid Crystal Display) 63. The edge of the light conducting plate 64 in the width direction is illuminated by a backup light (not shown) to entirely and evenly illuminate the back side of the LCD 63 through the light conducting plate 64.

Also, the display 41 has an anisotropic conducting member 65 in which a plurality of wires is penetrated into an insulating sheet made of resin such as silicon rubber every predetermined pitch. The anisotropic conducting member 65 is held between an arm part 64A and an arm part 64B of the light conducting plate 64, with the longitudinal direction of each wire almost being in parallel to the thickness direction of the light conducting plate 64, so that one end of each wire is electrically connected to a plurality of electrodes of the LCD 63.

Figure 14:
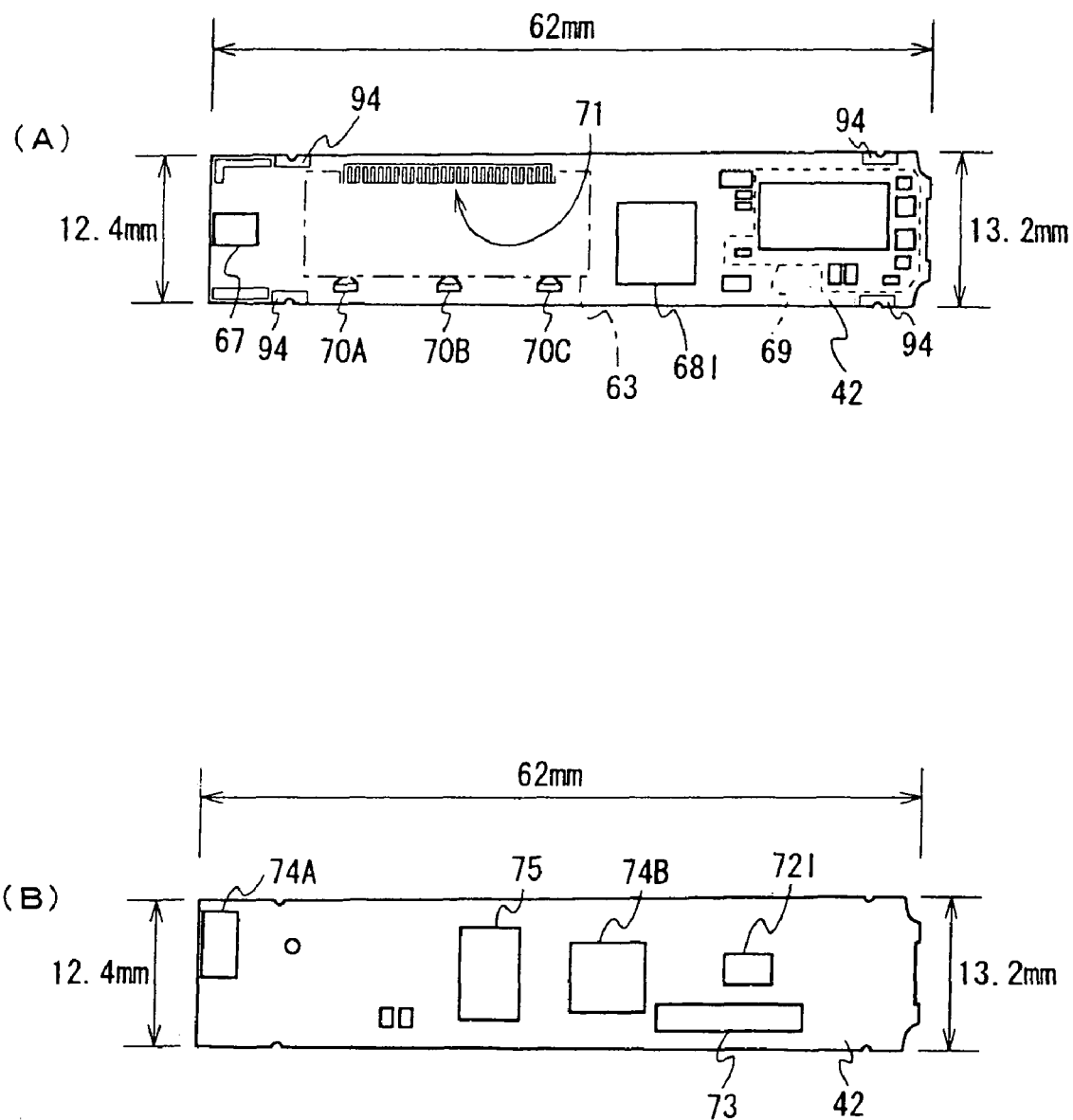
FIG. 14(A) is a brief linearly up-side view showing one side of a sub circuit board.
FIG. 14(B) is a brief linearly bottom-side view showing the other side of the sub circuit board.

As shown in FIG. 14(A), the sub circuit board 42 has a trapezoid shape, that the width at one end is 12.4 [mm] and the width at the other end is 13.2 [mm]. Surface-mounted electronic parts such as a switch circuit element 67 for the play/stop button 19, an IC (Integrated Circuit) package 681 constituting the LCD controller, circuit elements 69 constituting a digital-to-analog converting circuit and an amplifier are mounted on one plane of the sub circuit board 42. And a plurality of LEDs (Light Emitting Diode) 70A to 70C for backup light are also mounted, corresponding to the light conducting plate 64.

Further, on one plane of the sub circuit board 42, a plurality of lands for LCD 71 having a conductor pattern, which corresponds to respective electrodes of the LCD 63 are formed. When it is contained in the housing case 10, the lands for LCD 71 are electrically connected to the respectively corresponding electrodes of the LCD 63 with respective wires of the anisotropic conducting member 65.

Further, as shown in FIG. 14(B), surface-mounted electronic parts such as an IC package 721 constituting the EEPROM (Electrically Erasable Programmable Read-Only Memory) are mounted on the other plane of the sub circuit board 42. For example, among a pair of connectors for directly connecting the circuit boards to each other (hereinafter, referred to as boards connector), a male-type boards connector 73 is mounted on a predetermined place.

In this connection, on the other plane of the sub circuit board 42, lands for switch 74A and 74B which are electrically connected to respective switch elements 57 to 61, which are provided on the display protecting member 40, with a flexible board (not shown) are provided in a form of the conductor pattern, and a land for circuit board 75 which is electrically connected to the switch circuit board 44 is also formed.

Figure 15:
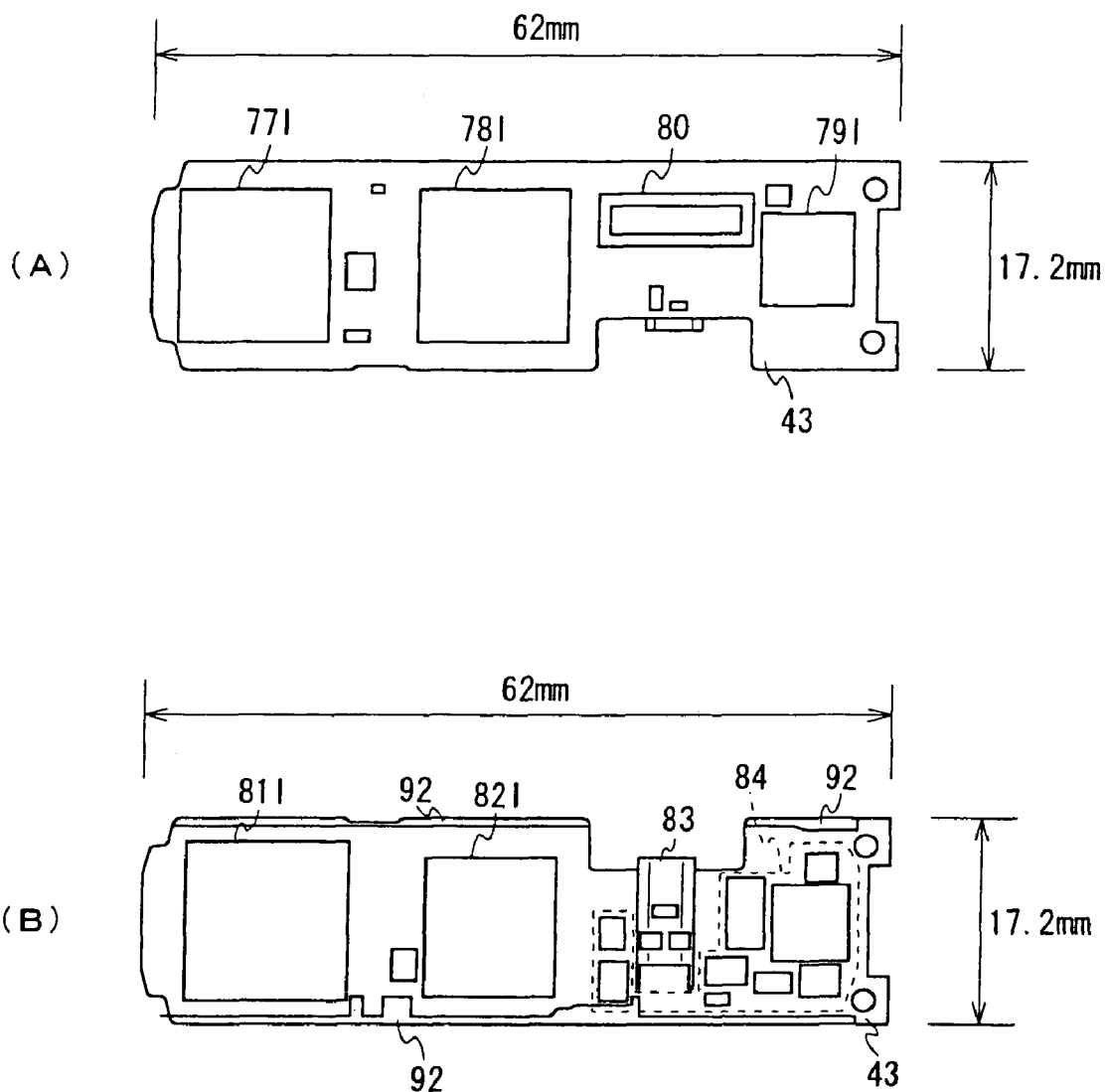
FIG. 15(A) is a brief linearly up-side view showing one side of a main circuit board.
FIG. 15(B) is a brief linearly bottom-side view showing the other side of the main circuit board.

As shown in FIG. 15(A), the main circuit board 43 is rectangular with the short side (that is, the width) of about 17.2 [mm] and the long side of about 62 [mm]. Surface-mounted electronic parts such as an IC package 771 constituting the flash memory controller, an IC package 781 constituting the CPU (Central Processing Unit), and an IC package 791 constituting the USB controller are mounted on one plane. And a female-type connector 80 for connecting boards is mounted at a predetermined place so as to fit the male-type boards connector 73 (FIG. 14(B)).

Further, as shown in FIG. 15(B), on the other plane of the main circuit board 43, surface-mounted electronic parts such as an IC package 811 constituting the semiconductor flash memory, an IC package 821 constituting a DSP (Display Signal Processor), an USB connector 83, and circuit elements 84 constituting power source circuits are mounted. In this connection, a negative electrode terminal 45 and the conducting plate 47 of the dry battery containing part 22 are electrically connected to the circuit elements 84 constituting the power source circuits.

Figure 16:
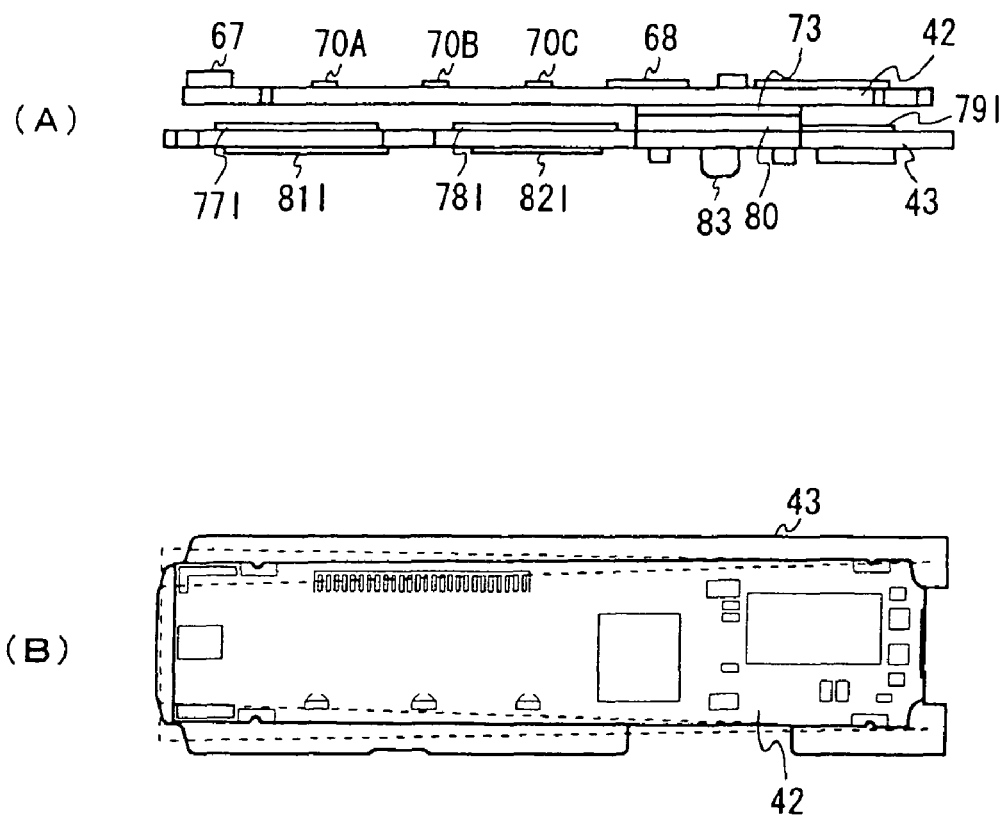
FIG. 16(A) is a brief linearly side view explaining the connection between the sub circuit board and the main circuit board.
FIG. 16(B) is a brief linearly up-side view explaining the connection between the sub circuit board and the main circuit board.

Then, as shown in FIGS. 16(A) and 16(B), in the main circuit board.43 and the sub circuit board 42 which are positioned in parallel to each other, the male-type boards connector 73 is inserted into the female-type boards connector 80 to mechanically and electrically connect them directly.

In this connection, a bus is provided in a form of a conductor pattern, and digital surface-mounted electronic parts connected to the bus are mounted on the main circuit board 43, and on the sub circuit board 42, analog surface-mounted electronic parts are mounted. Thereby, the surface-mounted electronic parts of the sub circuit board 42 is not influenced by noises occurred by the performance of the surface-mounted electronic parts of the main circuit board 43.

Further, the surface-mounted electronic parts on one plane of the main circuit board 43 do not face the surface-mounted electronic parts on the other facing plane of the sub circuit board 42 each other. Thereby, when they are connected with the boards connectors 80 and 73, the thickness between the main circuit board 43 and the sub circuit board 42 can be brought Close to the thickness of the surface-mounted electronic parts.

By the way, on the main circuit board 43 (FIG. 15(A)), as well as the surface-mounted electronic parts, the female-type boards connector 80 is positioned with solder, thereafter, is fixed by the reflow firehole which melts the solder. So, when the solder melts, the boards connector 80 may be fixed in the state that it rotates on one plane of the main circuit board 43, due to an error of the amount of solder applied on one plane or an error of the positioning of the boards connector 80.

Similarly, on the other plane of the sub circuit board 42 (FIG. 15(B)), as well as the surface-mounted electronic parts, the male-type boards connector 73 is positioned with solder, thereafter, is fixed by a reflow firehole which melts the solder.

Therefore, when the solder melts, the boards connector 73 may be fixed in the state that it rotates on the other plane of the sub circuit board 42, due to an error of the amount of solder applied on the other plane or an error of the positioning of the boards connector 73.

On this account, the sub circuit board 42 (FIG. 16(B)) may be connected to the main circuit board 43 in a state that the sub circuit board 42 rotates by 5 degrees at maximum in parallel to the main circuit board 43 with the mounting position of the boards connector 73 being centered.

Then, on one plane of the main circuit board 43, the boards connector 80 is mounted at a predetermined position of the other end side. Also, on the other plane of the sub circuit board 42, the connector for connecting boards 73 is mounted at a predetermined position of the other end side. Thereby, when the sub circuit board 42 is connected to the main circuit board 43 in a state of rotating in parallel to one plane of the main circuit board 43, rocking amount in the longitudinal direction of the main circuit board 43 becomes largest at one end side of the sub circuit board 42.

However, the sub circuit board 42 is formed with a trapezoid shape in which the width of one end is smaller than that of the other end, so as to be connected to the main circuit board 43 within the angle at which the both side planes of the sub circuit board 42 are in parallel to the corresponding both side planes of the main circuit board 43. Thus, even in a state that the sub circuit board 42 is being connected to the main circuit board 43, it can be easily contained in a circular-shaped storing space in the front side case 35.

Practically, in the front side case 35 (FIG. 9), a positioning pin 86 for positioning the display protecting member 40 is provided at a predetermined position at the bottom of one end side. Moreover, L-shaped supporting columns 87A to 87D corresponding to the four corners of the display 41 are provided at the circumference of the display window 11, and a plate member 88 corresponding to the anisotropic conducting member 65 of the display 41 is provided.

In addition to this, in the display protecting member 40 (FIG. 12), an hole part 40C corresponding to the positioning pin 86 of the front side case 35 is perforatively provided at the mostly center of the flat part 40A, and hole parts 40D to 40H corresponding to the supporting columns 87A to 87D and the plate-member 88 of the front side case 35 are perforatively provided at the circumference of the opening part 40B.

Figure 17:
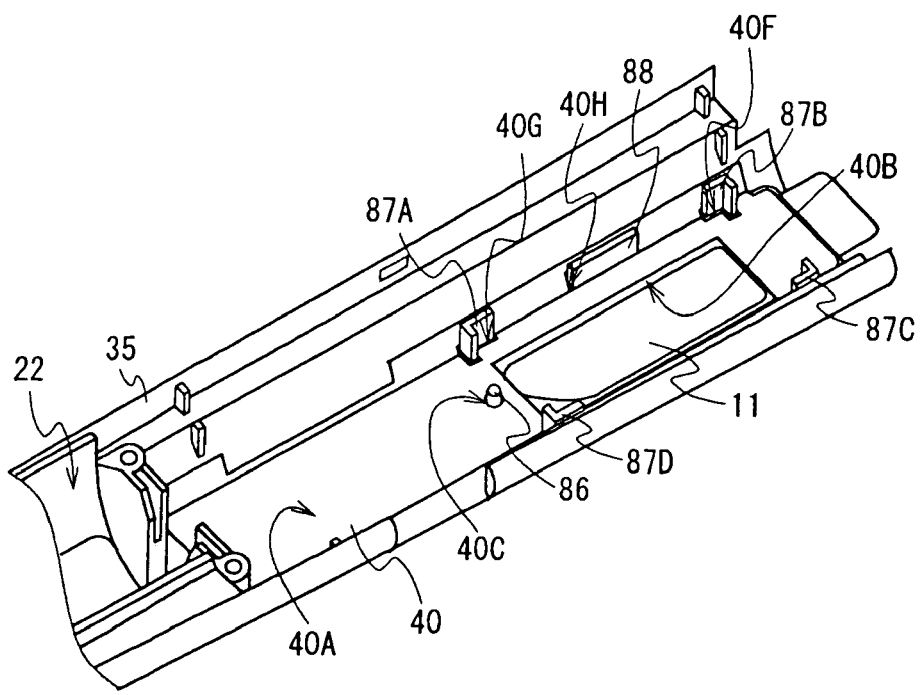
FIG. 17 is a brief linearly oblique perspective diagram explaining the mounting of the display protecting member on the front side case.

Thus, in the front side case 35, as shown in FIG. 17, the supporting columns 87A to 87D and the plate member 88 are passed through the corresponding hole parts 40D to 40H of the display protecting member 40 at one end side, and the positioning pin 86 is passed through the corresponding hole part 40C, so that the display protecting member 40 can be positioned not to move in the longitudinal direction of the case. Therefore, the display protecting member 40 can be mounted in such a state that the opening part 40B faces to the display window 11.

Figure 18:
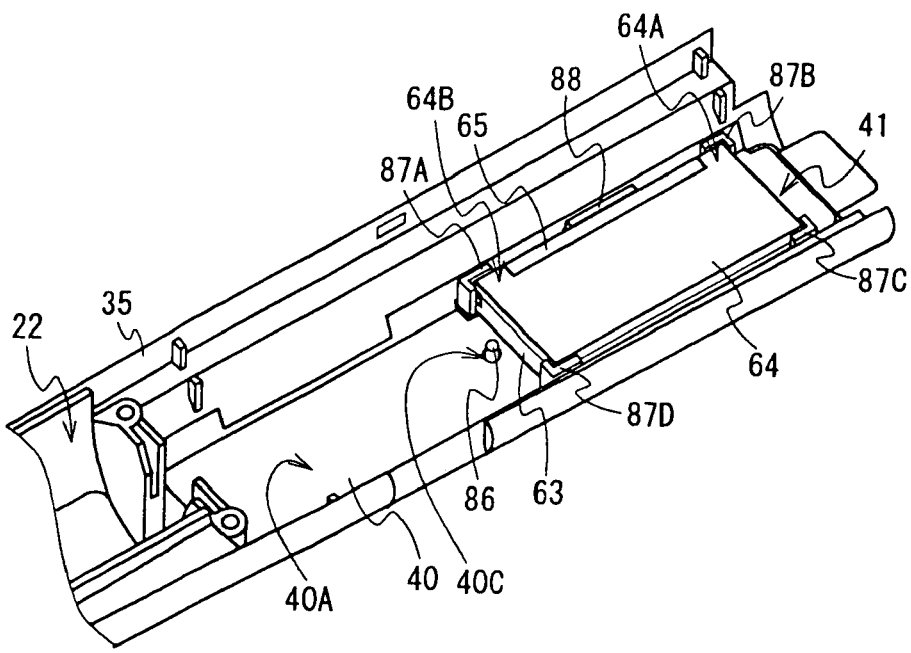
FIG. 18 is a brief linearly oblique perspective diagram explaining the mounting of the display.

Further, in the front side case 35, as shown in FIG. 18, the four corners of the display 41 are fitted into the corresponding supporting columns 87A to 87D, to support the LCD 63 facing to the opening part 40B. At this time, the plate member 88 is brought Close to the anisotropic conducting member 65 so that the LCD 63 is prevented from being dropped out from between arm parts 64A and 64B of the light conducting plate 64.

Figure 19:
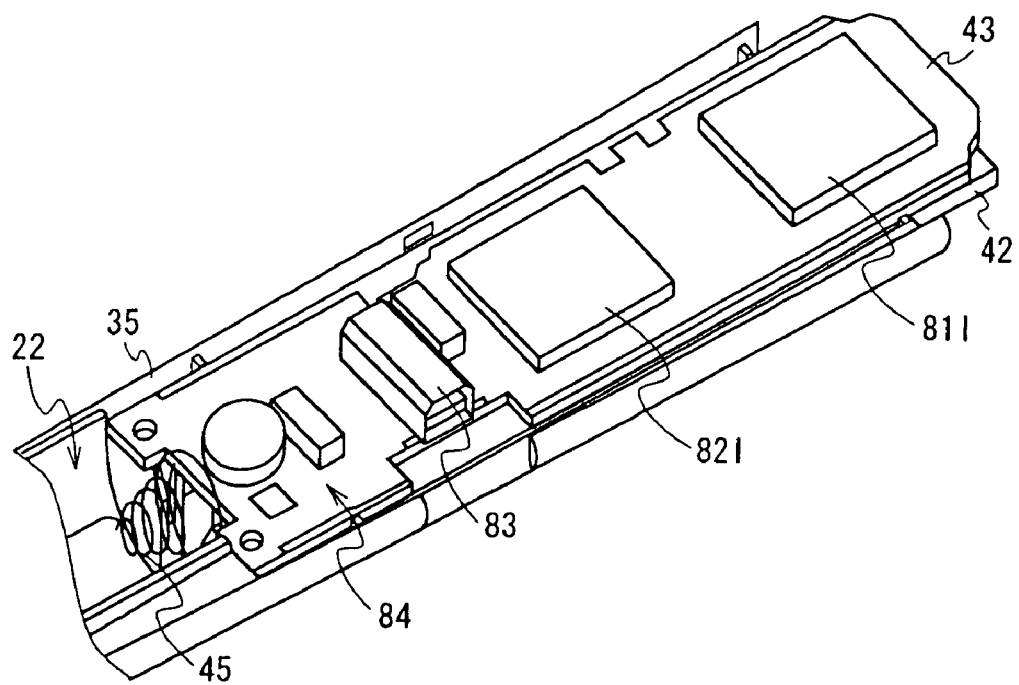
FIG. 19 is a brief linearly oblique perspective diagram explaining the accommodating of the main circuit board and the sub circuit board in the housing case.

Then, in the front side case 35, as shown in FIG. 19, the main circuit board 43 and the sub circuit board 42 which are connected each other with a pair of the boards connectors 80 and 73 are contained in such a way that the one plane of the sub circuit board 42 faces to the flat part 40A of the display protecting member 40 (FIG. 18).

Figure 20:
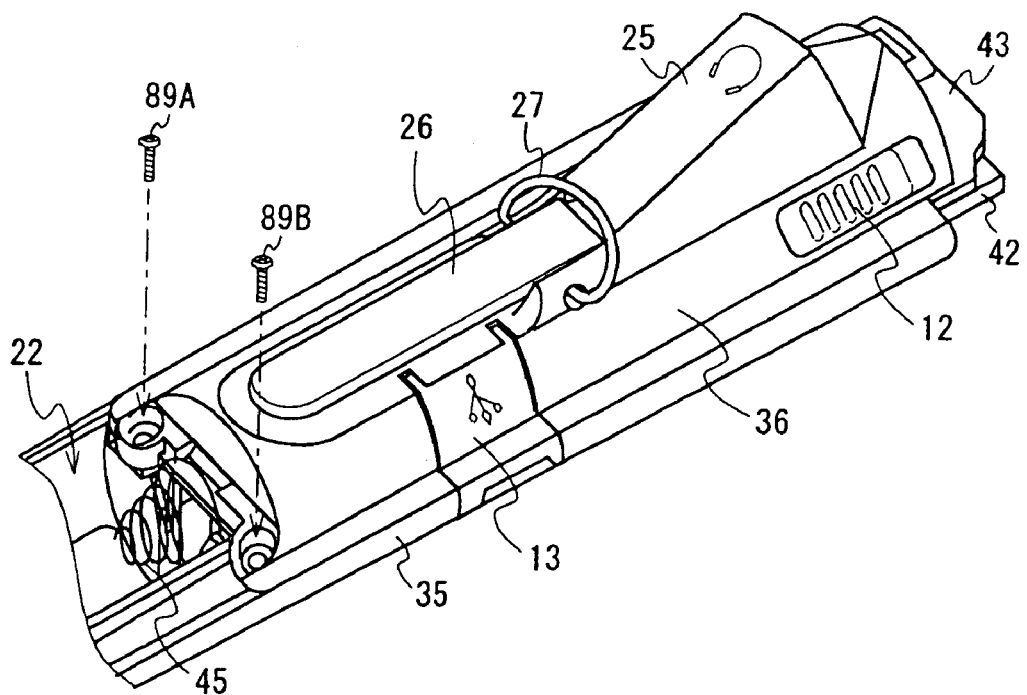
FIG. 20 is a brief linearly oblique perspective diagram explaining the fitting of the back side case to the front side case.

Next, as shown in FIG. 20, the back side case 36 is fitted to the front side case 35. In this state, the main circuit board 43 (FIG. 19) is fixed to the back side case 36 by fixing screws 89A and 89B.

By the way, as the boards connectors 80 and 73 mounted on the main circuit board 43 and the sub circuit board 42, downsized connectors which has a relatively small and short externality are selected.

Therefore, in the boards connectors 80 and 73, the mounting area is reduced to prevent the main circuit board 43 and the sub circuit board 42 from being enlarged, and the main circuit board 43 and the sub circuit board 42 are as Close to each other as possible, to reduce the containing space in the housing case 10.

However, since the boards connectors 80 and 73 have been downsized, the connector pins provided in the boards connectors 80 and 73 become minute, and the elasticity of the connector pin itself becomes smaller.

On this account, in the boards connectors 80 and 73, while the main circuit board 43 and the sub circuit board 42 are contained in the housing case 10, when the load is added to the sub circuit board 42 in the direction of rotation in parallel to one plane of the main circuit board 43, it can be considered that loose connection occurs between the connector pins corresponding to the boards connectors 80 and 73.

Figure 21:
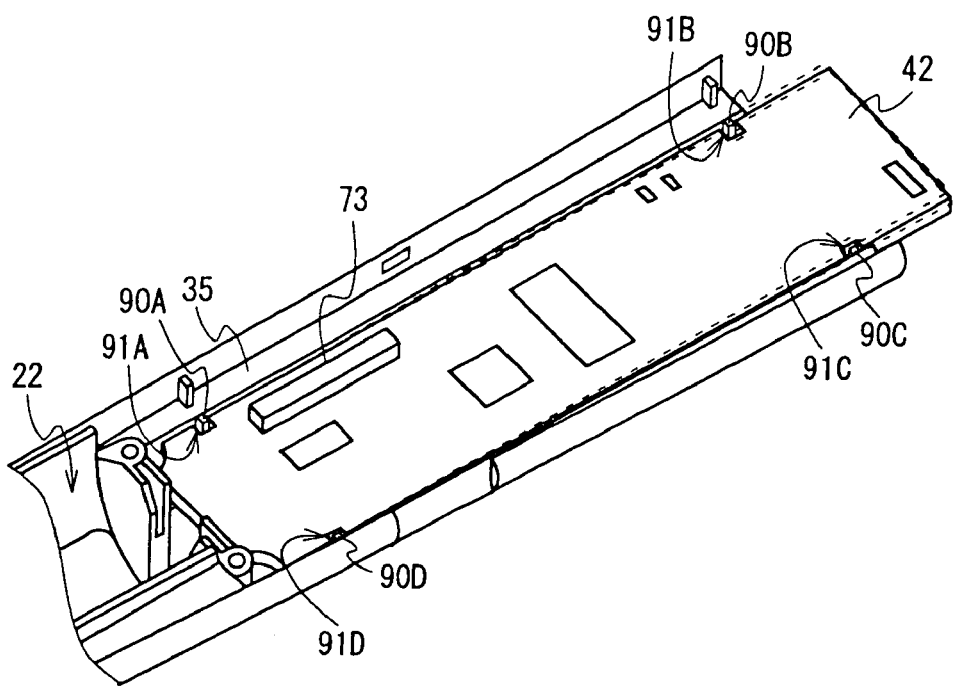
FIG. 21 is a brief linearly oblique perspective diagram explaining the accommodating of the sub circuit board in the front side case.

Therefore, as shown in FIG. 21, even if the sub circuit board 42 is contained in a state that it rotates in parallel to one plane of the main circuit board 43 (FIG. 19), which is fixed in the front side case 35, the sub circuit board 42 is formed with a trapezoid shape, of which the widths of one end and the other end are selected in order to allow the rotation in the internal of the front side case 35. The sub circuit board 42 is not fixed onto the front side case 35 in particular.

Therefore, in the digital reproducing device 4, even in a state that the sub circuit board 42 stored together with the main circuit board 43 rotates in parallel to one plane of the main circuit board 43, it is prevented that the loose connection occurs between the connector pins corresponding to the boards connectors 80 and 73.

Further, in the digital reproducing device 4, it is considered that the boards connectors 80 and 73 are separated from the main circuit board 43 and the sub circuit board 42, if dropping impact, etc. is added to the digital reproducing device 4 in a state that the external pressure in the direction of rotation in parallel to one plane of the main circuit board 43 is added to the sub circuit board 42. However, the sub circuit board 42 is not fixed in particular, so that the boards connectors 80 and 73 can be prevented from being separated.

In this connection, in the front side case 35, projection parts for movement regulation 90A to 90D are respectively provided on one end side and the other end side of the inner plane. Notch parts 91A to 91D which are wider than the projection parts for movement regulation 90A to 90D are provided on one side plane and the other side plane of both side planes of the sub circuit board 42, correspondingly to the projection parts for movement regulation 90A to 90D.

Then, the sub circuit board 42 is contained in the front side case 35, in such a way that at least the notch parts 91A and 91D at the other side plane are engaged into the corresponding projection parts for movement regulating 90A and 90D in accordance with the rotation angle with respect to the main circuit board 43, so that the sub circuit board 42 is regulated not to move in the longitudinal direction of the case.

Further, in the sub circuit board 42 (FIG. 14(A)), the land for LCD 71 is formed with a predetermined length along the width direction of the sub circuit board 42. Thereby, if the sub circuit board 42 is contained in a state of rotating in parallel to the main circuit board 43, the wire of the anisotropic conducting member 65 can be electrically connected to the land for LCD 71 certainly.

By the way, the housing case 10 is formed according to the criteria of cylindrical shape having an outside diameter of about 17 [mm]. However, the IC package 771 constituting the flash memory controller and the IC package 781 constituting the CPU are respectively formed into a square shape having a side of about 16 [mm], so that the main circuit board 43 (FIGS. 15(A) and 15(B)) is formed into a rectangular shape having a width of about 17.2 [mm] accordingly.

Figure 22:
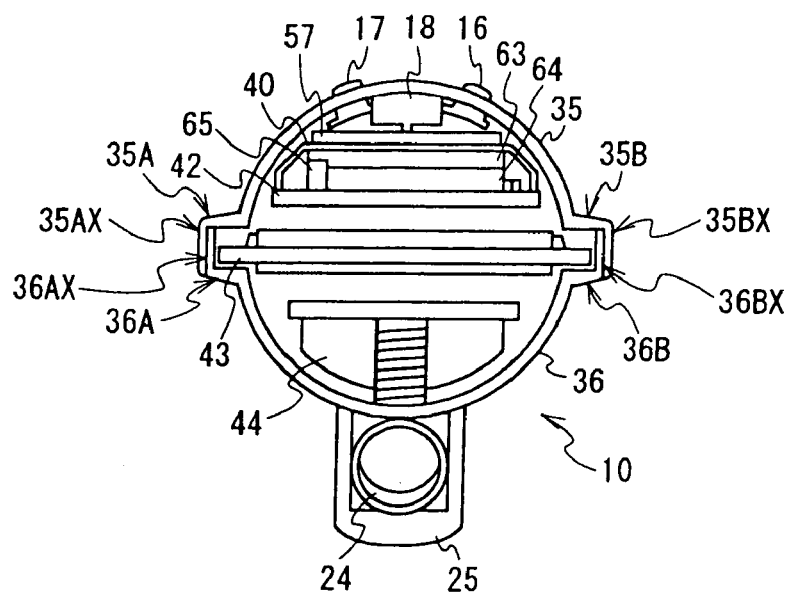
FIG. 22 is a brief linearly oblique perspective diagram explaining the accommodating of the main circuit board in the housing case.

Thus, as shown in FIG. 22, at the joining part between the front side case 35 and the back side case 36, L-shaped ribs 35A, 35B, 36A, and 36B are so provided as to project outside along the longitudinal direction of the case.

And, to the front side case 35, fitting parts 36AX and 36BX which are nearly in parallel to the right and left side planes in the corresponding ribs 36A and 36B of the back side case 36 are fitted into fitting parts 35AX and 35BX which are nearly in parallel to the right and left side planes in the ribs 35A and 35B.

Thereby, in the housing case 10, the main circuit board 43 is contained between the internal of the convex projection part composed of the fitted ribs 35A and 36A and the internal of the convex projection part composed of the other ribs 35B and 36B, so that the main circuit board 43 can be easily contained together with the display protecting member 40, the display 41, the sub circuit board 42, and the switch circuit board 44, without spoiling the cylindrical shape of the housing case 10.

Further, in the housing case 10, the fitting parts 35AX, 35BX, 36AX, and 36BX of the corresponding ribs 35A, 35B, 36A, and 36B of the front side case 35 and the back side case 36 are fitted, so that the ribs 35A and 35B, and 36A and 36B are integrated one another to improve the rigidity of the housing case 10.

By the way, on the other plane (FIG. 15(B)) of the main circuit board 43, a conducting pattern for grounding (hereinafter, referred to as ground pattern) 92 is formed at both end parts in the width direction from one end to the other end in the longitudinal direction, and the ground pattern 92 at both end parts are arranged Close to a pair of corresponding ribs 35A and 36A, and 35B and 36B.

Figure 23:
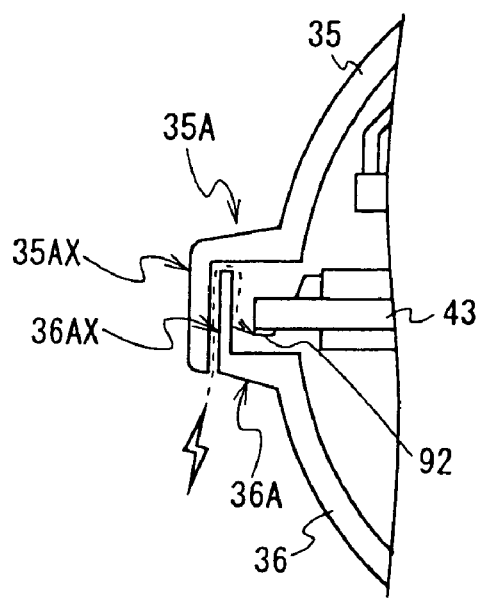
FIG. 23 is a partly cut-off brief linearly cross-sectional diagram explaining the flow of static electricity to the main circuit board.

Thereby, as shown in FIG. 23, when the housing case 10 is brought Close to the charged metal member, etc., even if static electricity has entered from outside to inside through gaps between the ribs 35A, 36A, 35B, and 36B, the static electricity is first to be brought in by the comparatively large ground pattern 92 at both end parts of the main circuit board 43, so as to prevent the internal surface-mounted electronic parts from being damaged by high-voltage static electricity.

Further, the display protecting member 40 (FIG. 12) is made of conductive metal plate as described above, and the projection parts 40K and 40L are provided at one end side and the other end side of both leg parts 40I and 40J.

In addition to this, on one plane of the sub circuit board 42 (FIG. 14(A)), a ground pattern 94 is formed at both end parts in the width direction, correspondingly to the projection parts 40K and 40L of the display protecting member 40.

Figure 24:
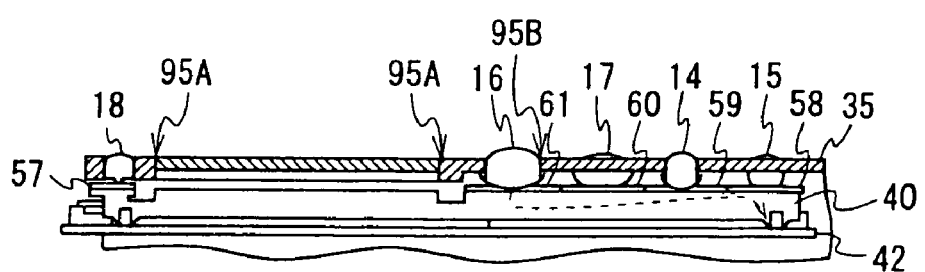
FIG. 24 is a brief linear side view explaining the assembling of the display protecting member and the sub circuit board.
Figure 25:
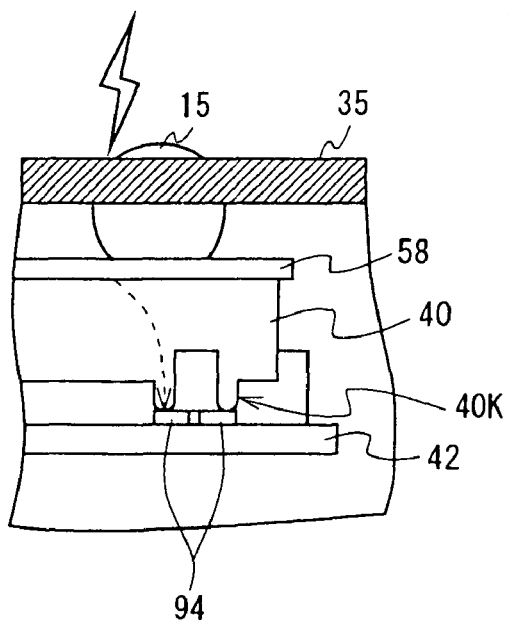
FIG. 25 is a partly cut-off brief linearly side view explaining the flow of static electricity from the display protecting member to the sub circuit board.

Then, as shown in FIGS. 24 and 25, when the display protecting member 40 is contained in the housing case 10, it is positioned by the positioning pin 86 in the front side case 35, and the sub circuit board 42 is contained with few movement in the longitudinal direction of the case. Thereby, the projection parts 40K and 40L provided in the leg parts 40I and 40J are electrically connected to the corresponding ground pattern 94 of the sub circuit board 42.

Thus, when the housing case 10 is become Close to the charged metal member, etc., even if static electricity is entered from outside to inside through a gap 95A between the front side case 35 and the display window 11 or gaps 95B between the volume up button 14, the volume down button 15, the forwarding button 16, the rewinding button 17, and the shift button 18 and the hole part provided in the front side case 35 for holding these buttons, the static electricity are taken into the display protecting member 40 which is Close to these gaps and are brought into the ground pattern 94 of the sub circuit board 42, so as to prevent the LCD 63 and the switch elements 57 to 61 from being damaged by high-voltage static electricity.

In addition to this, the display protecting member 40 is supported by the sub circuit board 42, and is made of metal plate, so that when the switch elements 57 to 61 provided on the flat part 40A are pressed through the corresponding shift button 18, volume down button 15, volume up button 14, rewinding button 17, and forwarding button 16, it has rigidity enough to sustain the pressure without deformation. Thereby, a gap between the inner side plane of the front side case 35 and the flat part 40A can be used effectively as containing space for the switch elements 57 to 61.

Further, the display protecting member 40 is made of metal plate as described above. Thereby, if it is selected to relatively thin in its thickness, the display protecting member 40 can ensure the rigidity enough to sustain the pressure of the switch elements 57 to 61. Therefore, containing space used exclusively by the display protecting member 40 in the housing case 10 can be reduced remarkably.

(2-2) The Circuit Constitution of the Digital Reproducing Device

Figure 26:
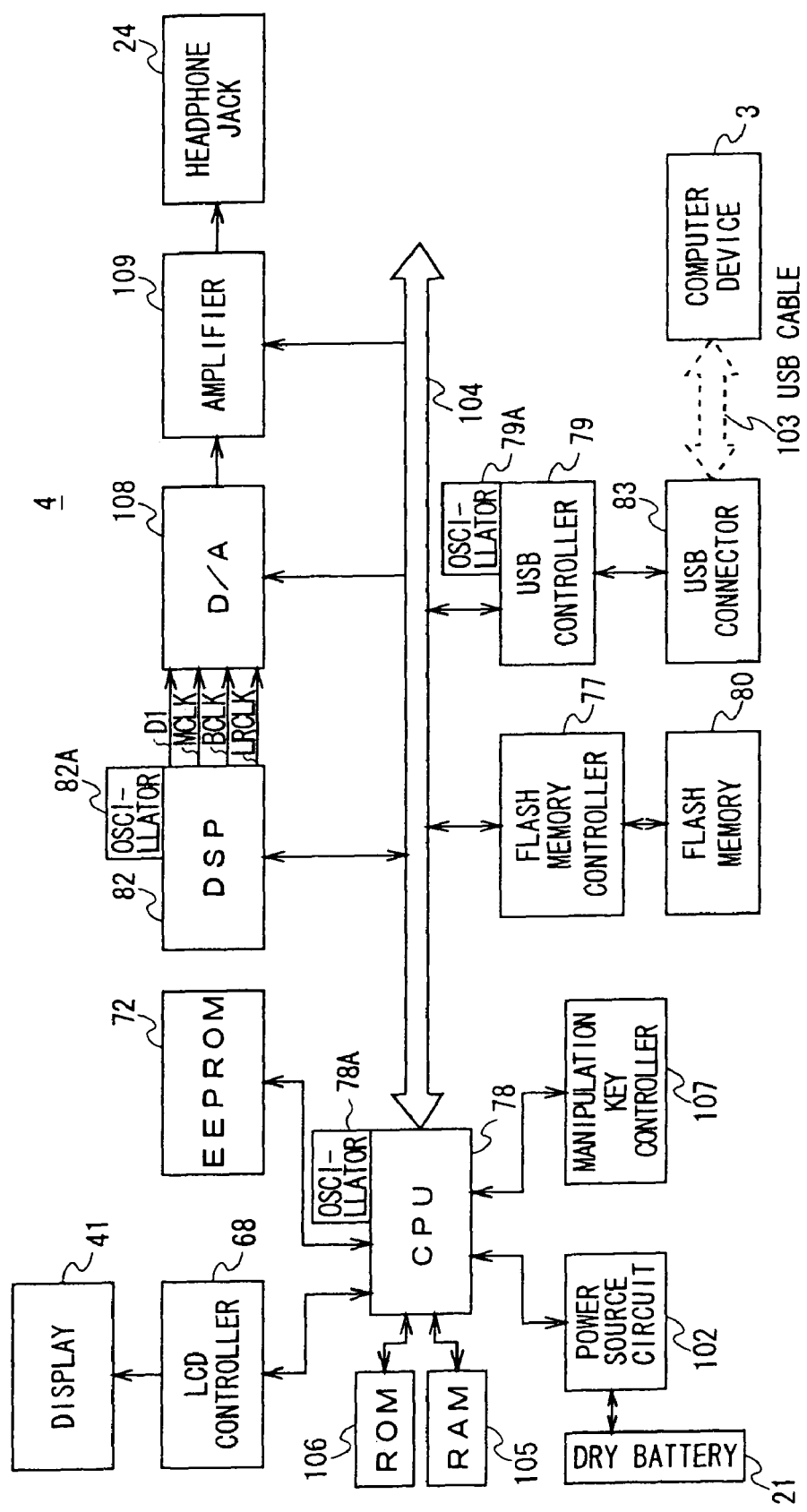
FIG. 26 is a block diagram showing the circuit constitution of the digital reproducing device.

Next, the circuit constitution of the digital reproducing device 4 will be explained with reference to FIG. 26. The digital reproducing device 4 converts the power source voltage which is supplied from the dry battery for driving 21, into the inner electric power of a predetermined voltage at a power source circuit 102 to supply it to the CPU 78 and respective circuit blocks, so as to drive the whole device.

When the digital reproducing device 4 is connected to the computer device 3 with the USB cable 103 via the USB connector 83, the digital music contents C1 bulk-transferred from the computer device 3 is supplied by the USB controller 79 to the CPU 78 through an internal bus 104.

Here, the digital music contents C1 is 64 byte per a packet as the frame form, and is transferred from the computer device 3 at a transfer rate, 12 [Mbit/sec].

Figure 27:
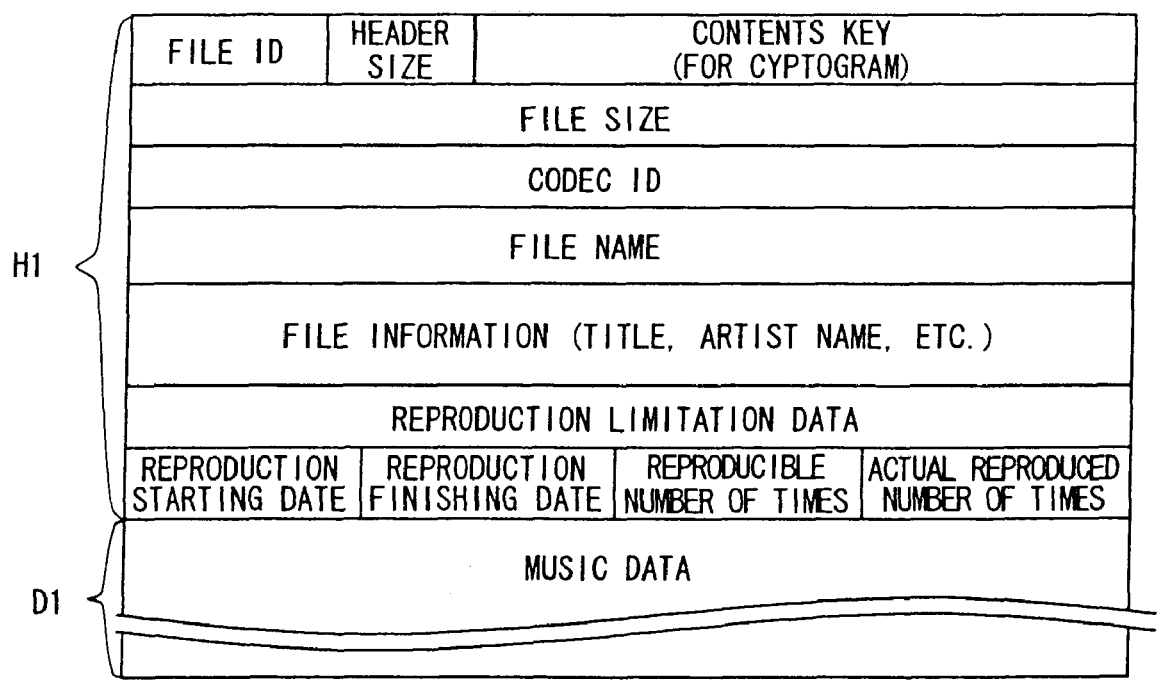
FIG. 27 is a brief linear diagram showing the data structure of the digital music contents.

The digital music contents C1 is composed of the header Hi and the music data Dl as shown in FIG. 27. In the header H1 stores "file ID", "header size", "contents key (for encryption)", "file size", "codec ID", "file name", and "file information" are stored, and "reproduction limitation data", "reproduction starting date", "reproduction finishing date", "reproducible number of times", and "real reproduced number of times" are stored as reproduction limitation information necessary to perform a reproduction limitation processing.

Figure 28:
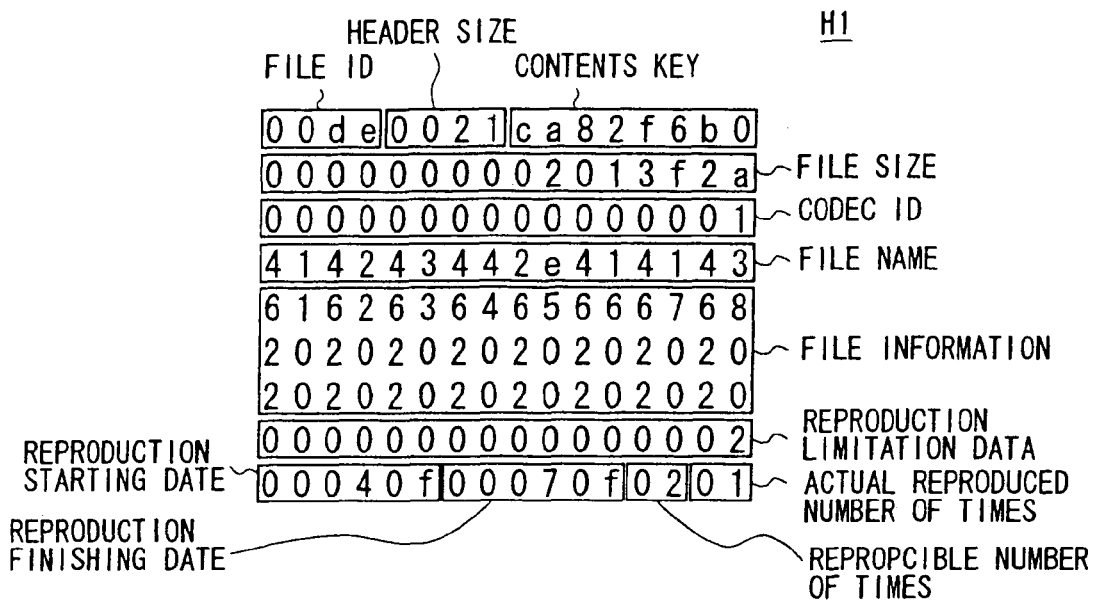
FIG. 28 is a brief linear diagram showing the data structure in a header (1).

Practically, as shown in FIG. 28 in which the stored information is expressed by hexadecimal digit, "header size" represents the data size of the header H1 (33 bytes in this case) and "file size" represents the data size of the file of the music data D1' (33636138 bytes in this case).

Further, "contents key" is cipher data for deciphering the code of the music data D1 (FIG. 27). When the digital music contents C1 is given and received between the computer device 3 and the digital reproducing device 4 practically, it is further enciphered by a common session key and is transferred.

Practically, when the computer device 3 and the digital reproducing device 4 are connected to each other, the digital reproducing device 4 is needed to be certified by the computer device 3. In this case, the certification is performed with a challenge response method between the computer device 3 and the digital reproducing device 4. In this connection, in the digital reproducing device 4, the DSP 82 performs the deciphering processing in certification by the challenge response method.

Here, the challenge response method is a method that the digital reproducing device 4 makes a response to an value (challenge) generated by the computer device 3, with a value (response) generated by using a secret key which is commonly used between the digital reproducing device 4 and the computer device 3. Since the challenge changes every time, there is no risk that the response is reused if it has been bugged, so as to securely realize two-way authentication.

"Codec ID" is an ID number corresponding to the extending method when the music data D1 of the digital music contents C1 is reproduced by the digital reproducing device 4. The extending method in accordance with the data compressing method called ATRAC (Adaptive Transform Acoustic Coding) 3 is assigned to the ID number "1", and the extending method in accordance with the data compressing method called MP3 (MPEG Audio Layer-3) is assigned to the ID number "0".

"File name" is data obtained by converting the file name, e.g., "ABCD.AAC" into ASCII (American National Standard Code for Information Interchange) codes. "File information" is data obtained by converting the title, name of artist, name of songwriter, name of musical composer and so on of the digital music contents C1, into ASCII codes.

"Reproduction limitation data" is data representing whether or not the reproduction limitation such as the reproducible term or the reproducible number of times is added to the digital music contents C1 reproduced by the digital reproducing device 4. Only when the reproducible number of times is limited, "1" is assigned to "reproduction limitation data", and only when the reproducible term is limited, "2" is assigned to it. When there is no reproduction limitation, that is when the digital music contents C1 is purchased by "purchase", "0"• is assigned to it.

"Reproduction starting date" and "reproduction finishing date" are data representing the range of the reproducible term, when the "reproduction limitation data" is "2", and the data of "00040F" and "00070F" represents that the reproducible term is between "Apr. 15, 2000" and "Jul. 15, 2000".

Similarly, "reproducible number of times" and "real reproduced number of times" are, when "reproduction limitation data" is "1" and "2", data representing the reproducible maximum number of times which has been previously prescribed and the real number of times of reproduction which is renewed by the CPU 78 when the reproduction processing is executed. The data of "02" and "01" represents that "reproducible number of times" is "two" times and "real reproduced number of times" is "one" time at the present moment.

Figure 2:
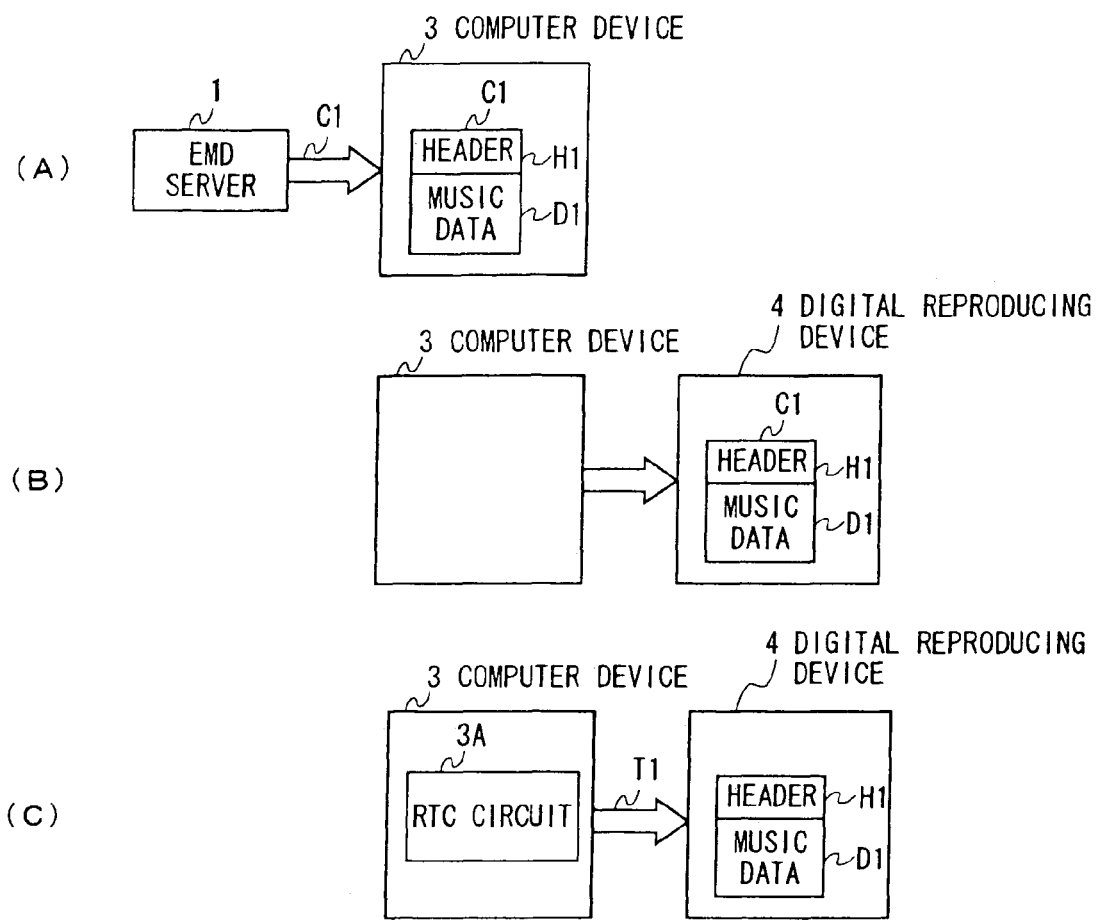
FIG. 2(A) is a schematic diagram explaining the download of the digital music contents from an EMD server to a computer device.
FIG. 2(B) is a schematic diagram explaining the upload of the digital music contents from the computer device to a digital reproducing device.
FIG. 2(C) is a schematic diagram explaining the reproduction limits of the digital music contents.

Thereby, according to the reproduction limitation information of the header H1, as described in FIG. 2, the digital reproducing device 4 can repeatedly execute the reproduction processing twice for each processing again and again, between "Apr. 15, 2000" and "Jul. 15, 2000".

Figure 29:
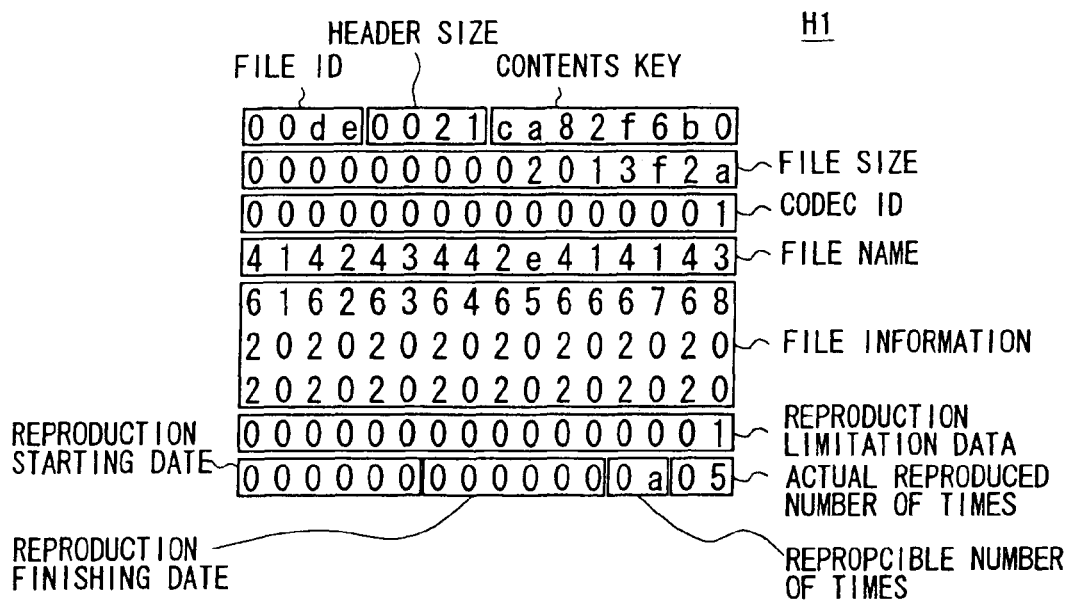
FIG. 29 is a brief linear diagram showing the data structure in the header (2).

In this connection, as shown in FIG. 29, in the header Hi of the digital music contents C1 with only the reproducible number of time as reproduction limitation, "reproduction limitation data" shows "1", "reproduction starting date" and "reproduction finishing date" show "000000" and "000000", and "reproducible number of times" and "real reproduced number of times" show "Oa" and "05". More specifically, this shows that there is no limitation in the reproducible term specified by "reproduction stating date" and "reproduction finishing date", and "reproducible number of times" represents "ten" times and the current "real reproduced number of times" represents "five" times.

By the way, the write instruction of the digital music contents C1 is transferred to the digital reproducing device 4 (FIG. 26) from the computer device 3 as well as the digital music contents C1. When the CPU 78 receives the write instruction at the RAM (Random Access Memory) 105, the flash memory controller 77 is controlled in accordance with the main program read out from the ROM (Read-Only Memory) 106 to the RAM 105, to write the digital music contents C1 in the semiconductor flash memory 80.

In this connection, the semiconductor flash memory 80 has a memory size of approximately 64 [Mbytes], and can store musical compositions for one CD (Compact Disc) album or more.

Further, the semiconductor flash memory 80 previously stores a reproduction code for reproducing the music data D1 by the extending method corresponding to the music data D1 compressed by a predetermined compressing method in the digital music contents C1.

Thereby, in the digital reproducing device 4, when the reproduction instruction by pressing the play/stop button 19 is given to the CPU 78 by an user with a manipulation key controller 107, the reproduction code and the music data D1 of the digital music contents C1 are read from the semiconductor flash memory 80 by the CPU 78 and are transferred to the RAM (not shown) of the DSP 82.

The DSP 82 detects errors in the music data D1 of the digital music contents C1 by a CRC (CyClic Redundancy Check) method on the basis of the reproduction code transferred from the semiconductor flash memory 80, and then extends and reproduces it. The reproduced data is supplied to a digital-to-analog converting circuit 108.

Here, the DSP 82 is an IC package 821 (FIG. 15(B)) integratedly constructed with an oscillating circuit (not shown) provided internally. The DSP 82 reproduces the music data D1 on the basis of a master Clock MC1K from an oscillator 82A being an external crystal, and sends operation Clocks comprising the master Clock MC1K, a bit Clock BC1K having a predetermined frequency generated at the internal oscillating circuit on the basis of the master-ClockMC1K,_a_L-channel Clock LC1K in a frame, and a R-channel Clock RC1K, to the digital-to-analog converting circuit 108.

In this case, the DSP 82 sends the above-mentioned operation Clocks to the digital-to-analog converting circuit 108 in accordance with the reproduction code while the music data Dl is reproduced. However, the DSP 82 halts the supplying of the operation Clocks not to operate the digital-to-analog converting circuit 108 in accordance with the reproduction code while the music data Dl is not reproduced. Thereby, the power consumption of the whole digital reproducing device 4 can be reduced.

Similarly, to the CPU 78 and the USB controller 79, the oscillators 78A and 79A made of crystal are externally attached. The master clock MC1K supplied from the oscillators 78A and 79A is used to execute predetermined processing.

Thus, in the digital reproducing device 4, a clock generating module for supplying a clock to respective circuit blocks such as the CPU 78, the DSP 82, and the USB controller 79 is unnecessary. Therefore, the circuit constitution can be simplified and downsized.

The digital-to-analog converting circuit 108 converts the reproduced music data Dl into an analog audio signal, which is sent to an amplifier 109. The amplifier 109 amplifies the audio signal to a predetermined level, and then outputs it from the headphone jack 24 to the headphone 5, so that the music reproduced via the headphone 5 is given to users.

In this way, the digital reproducing device 4, when the play/stop button 19 is pressed, reproduces the music data D1 of the digital music contents C1 stored in the semiconductor flash memory 80 under the control of the CPU 78, and when the play/stop button 19 is pressed during reproduction, stops the reproduction.

Further, the digital reproducing device 4, when the play/stop button 19 is pressed again after the reproduction is stopped, resumes the reproduction of the music data Dl at the stop position under the control of the CPU 78. When no manipulation is made for several seconds or more after the play/stop button 19 is pressed to stop the reproduction, the digital reproducing device 4 automatically shut off the power supply in order to reduce the power consumption.

In this connection, the digital reproducing device 4 does not reproduce the music data D1 from the last stop position, but reproduces it from the first track, when the play/stop button 19 is pressed aster the power supply is shut off.

Further, the digital reproducing device 4 controls the LCD controller 68 by the CPU 78, so as to display on the display 41 various information such as reproduction mode state, equalizer adjustment (sound quality mode), track number, reproduction time, processing state of reproduction, stop, forwarding, and rewinding, volume, and battery remaining amount.

Further, in the digital reproducing device 4, the EEPROM 72 stores so-called FAT (File Allocation Table) such as the number of tracks in the whole digital music contents C1 written in the semiconductor flash memory 80; the block position of the semiconductor flash memory 80 storing the digital music contents C1; and the other various memory accumulating information.

In this connection, this embodiment treats 64 [Kbytes] of the digital music contents C1 as one block. The block position in accordance with the digital music contents C1 of one track is inCluded in the FAT.

Figure 30:
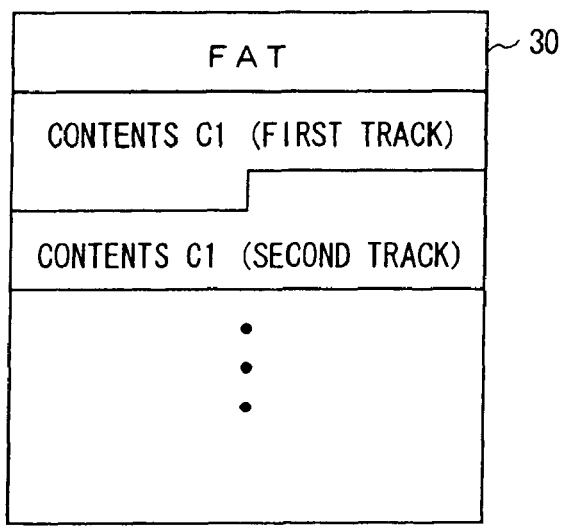
FIG. 30 is a brief linear diagram explaining the data structure of the semiconductor flash memory when the FAT is accommodated.

By the way, as shown in FIG. 30, in the case that the FAT is stored in the semiconductor flash memory 80, when the digital music contents C1 of the first track is written under the control of the CPU 78 for example, the block position of the first track in the digital music contents C1 is written as a FAT. When the digital music contents C1 of the second track is written, the block position of the first track in the digital music contents C1 and the block position of the second track in the digital music contents C1 are rewritten as a new FAT in the same area again.

In this way, since the FAT is rewritten whenever the digital music contents C1 is written in the semiconductor flash memory 80, the CPU 78 reads out the FAT so as to recognize the block position which is a place for storing the desired digital music contents C1.

Besides, in the FAT, the same data is doubly written for reserve, so that the data is protected by the FAT for reserve even if the dry battery for driving 21 is removed in writing the FAT.

However, although in the semiconductor flash memory 80, the stored digital music contents C1 is rewritten freely by the computer device 3, it is prescribed in the rewriting number of times in the present circumstances.

On this account, in the case that the FAT is stored in the semiconductor flash memory 80, the FAT is rewritten whenever the digital music contents C1 is stored, and the FAT is rewritten doubly, so that the rewriting number of times of the FAT is increased overly and the rewriting number of times of the digital music contents C1 is consumed.

More specifically, if the CPU 78 stores the FAT in the semiconductor flash memory 80, the rewriting number of times of the FAT increases and the rewriting number of times of the digital music contents C1 is decreased, and as a result, the prescribed rewriting number of times is not satisfied.

On the contrary, the EEPROM 72 is exclusively provided for storing the FAT. Whenever the CPU 78 stores the digital music contents C1 in the semiconductor flash memory 80, the CPU 78 may additionally store the FAT of the stored digital music contents C1 in the EEPROM 72, and it is unnecessary to rewrite whenever the digital music contents C1 is stored.

In this way, the CPU 78 does not store the FAT which is rewritten many times in the semiconductor flash memory 80, together with the digital music contents C1, but writes the FAT in the EEPROM 72 separately from the digital music contents C1, so that the prescribed number of times of rewriting in the semiconductor flash memory 80 can be effectively all used for rewriting the digital music contents C1.

Practically, the CPU 78 stores the digital music contents C1 in the semiconductor flash memory 80 and writes the FAT which is rewritten many times, in the EEPROM 72, so that the number of times of rewriting the digital music contents C1 in the semiconductor flash memory 80 can be increased several ten times or more, compared with the case where the FAT and the digital music contents C1 are stored together in the semiconductor flash memory 80.

Further, the CPU 78 additionally writes the FAT in the EEPROM 72, so that the number of times of rewriting the FAT is reduced the most to prevent the EEPROM 72 from being un-rewritable in a short period.

By the way, the digital reproducing device 4, when it is connected to the computer device 3 with the USB cable 103 (hereinafter, referred to as USB-connection), recognizes based on the interruption signal supplied from the USB controller 79 to the CPU 78, that it is USB-connected.

Then, when the digital reproducing device 4 recognizes that it is USB-connected, it receives the supply of the utility power of a prescribed electric current value from the computer device 3 through the USB cable 103, and at the same time, controls the power source circuit 102 to stop the supply of the internal power performed by the dry battery for driving 21.

At this time, the CPU 78 receives the supply of the utility power from the computer device 3 through the USB cable 103, and at the same time, stops the reproduction processing of the music data D1 performed by the DSP 82. Thereby, the CPU 78 prevents that the utility power supplied from the computer device 3 exceeds a prescribed electrical current value, and controls to constantly receive the utility power of a prescribed current power value.

In this way, when the CPU 78 is USB-connected, it switches from the internal power supplied from the dry battery for driving 21 to the utility power supplied from the computer device 3. Thereby, the low-cost utility power from the computer device 3 is used to reduce the power consumption of the high-cost dry battery for driving 21, so that the duration of life of the dry battery for driving 21 can be lengthen.

In addition, when the CPU 78 receives the supply of the utility power from the computer device 3 through the USB cable 103, it stops the reproduction processing of the music data D1 by the DSP 82, so as to reduce a radiation generated by the DSP's 82 operation. As a result, the whole radiation including the computer device 3 can be reduced remarkably.

Further, when the CPU 78 switches power from the internal power supplied from the dry battery for driving 21 to the utility power supplied from the computer device 3, it stops the reproduction processing of the music data D1 performed by the DSP 82, and writes the digital music contents C1 in the semiconductor flash memory 80 under the control of the computer device 3, without executing various operations in accordance with the manipulation of various buttons (the maximum volume fixing switch 12, the hold switch 20, the volume up button 14, the volume down button 15, the play/stop button 19, the forwarding button 16, the rewinding button 17, and so on). Thereby, even if the various operation buttons are pressed while the digital music contents C1 is rewritten, the operation of the device itself can be surely prevented from being unstable, and the digital music contents C1 can be protected.

Simultaneously, the CPU 78 switches power from the internal power supplied from the dry battery for driving 21 to the utility power supplied from the computer device 3, so as to surely receive the supply of the utility power from the computer device 3 at all times.

Thereby, even if the dry battery for driving 21 is removed and the battery is run down while the digital music contents C1 is written in the semiconductor flash memory 80 under the control of the computer device 3, the digital reproducing device 4 avoids that the processing stops, and surely executes the data writing processing.

At this time, the CPU 78 controls the LCD controller 68 on the basis of the utility power supplied from the computer device 3 to display "PC" on the display 41, which informs the user of what it is connected to the computer device 3 at present and can not operate with the various buttons and switches.

(3) Operations and Effects According to this Embodiment

In the above construction, in the digital reproducing device 4, in the housing case 10 for containing the dry battery for driving 21 as well as the various circuit boards inC1uding the main circuit board 43 and the sub circuit board 42, the strap fitting 27 is provided at a predetermined position which is a little C1ose to one end side from the center of gravity positioned at the nearly center part of the housing case 10, and the play/stop button 19 is provided on one plane of the housing case 10.

Then, the digital reproducing device 4 allows a user to attach the dangling strap 31 to the strap fitting 27, and to use the digital reproducing device 4 with the dangling strap 31 dangled from his neck.

Therefore, the digital reproducing device 4 can be used as being dangled from the user's neck by using the dangling strap 31. At this time, since the strap fitting 27 as a supporting point is positioned a little C1ose to one end side from the center of gravity in the case longitudinal direction, the position of the digital reproducing device 4, in which the other end side of the housing case 10 orients in the vertical down direction and the play/stop button 19 on one plane of the housing case 10 orients in the vertical up direction, can be kept even if the user changes his posture.

As a result, if the digital reproducing device 4 is used with being dangled from user's neck, the user only holds the circumference of the housing case 10 with a hand, and the user's thumb can easily manipulate the play/stop button 19 positioned on one plane of the housing case 10.

Also, in the digital reproducing device 4, the plug 29 of the headphone code 28 is inserted into the headphone jack-24—which is provided at one end side of the housing case 10 and which is slanted with respect to the longitudinal direction of the case, and the connection part between the plug 29 and the headphone code 28 is relatively distanced from the play/stop button 19, so that the connection part between the plug 29 and the headphone code 28 can not obstacle the manipulation of the play/stop button 19.

Further, in the digital reproducing device 4, since the plug 29 of the headphone code 28 is inserted into the headphone jack 24 from one end side to the other end side in the case longitudinal direction, when the dangling strap 31 is used to dangle the digital reproducing device 4, the dangling strap 31 and the headphone code 28 are strained in the same direction to have sense of unity. Thereby, botheration of the dangling strap 31 and the headphone code 28 can be reduced drastically when they are dangled from user's neck.

According to the foregoing construction, the strap fitting 27 is provided at a predetermined position which is a little close to one end side from the center of gravity positioned at the nearly center part of the housing case 10 in which the various circuit boards and the dry battery for driving 21 are contained internally, and the play/stop button 19 is provided on one plane of the housing case 10. Thereby, when the user attaches the dangling strap 31 to the strap fitting 27 and dangles it from his neck, the play/stop button 19 on one plane of the housing case keep its position toward the vertical upside direction, and the user can easily manipulate the play/stop button 19 with his thumb by holding the circumference of the housing case 1. Therefore, the digital reproducing device 4 which can improve the manipulation remarkably can be realized.

Further, in the foregoing construction, in this digital reproducing device 4, the ribs 35A and 35B, and 36A and 36B are provided in the longitudinal direction, at the joining parts of the front side case 35 and the back side case 35 constituting the housing case which is almost cylindrical in accordance with the outside diameter of the dry battery for driving 21.

And in the digital reproducing device 4, the front side case 35 is attached to the back side case 36 by fitting the fitting parts 35AX and 36AX, and 35BX and 36BX, in the ribs 35A and 35B, and 36A and 36B and the projecting parts are formed on the right side plane and the left side plane of the housing case 10, to contain the ends of the main circuit board 43 which projects from internal space of the cylindrical-shaped housing case 10, integrally with the internal space.

Therefore, in the digital reproducing device 4, though the main circuit board 43 is wider than the outside diameter of the cylindrical-shaped housing case 10, the main circuit board 43 can be easily contained between one end of the projecting part and the other end of projecting part, without spoiling the almost cylindrical form of the housing case 10. Thus, it is avoided that the whole housing case is enlarged due to the main circuit board 43.

Further, in the digital reproducing device 4, the ribs 35A and 35B, and 36A and 36B are formed on the front side case 35 and the back side case 36, which can improve the rigidity of the front side case and the back side case 36.

In addition to this, in the digital reproducing device 4, the front side case 35 and the back side case 36 are attached to each other, by fitting the fitting parts 35AX and 35BX, and 36AX and 36BX in the ribs 35A and 35B, and, 36A and 36B. Thereby the ribs 35A and 35B, and 36A and 36B are integrally fitted. Therefore, the fitting parts 35AX and 35BX, and 36AX and 36BX can form the projecting ribs each having a double structure, in the longitudinal direction of the case, facing each other, thus the rigidity of the housing case 10 can be also improved.

As a result, in the digital reproducing device 4, since the rigidity of the housing case 10 is improved, the housing case 10 can be made thinner, thus the housing case 10 can be further downsized.

Figure 31:
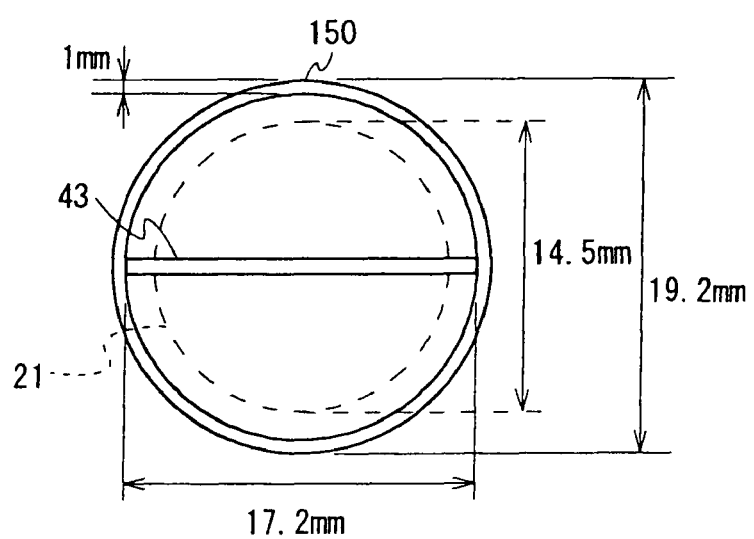
FIG. 31 is a schematic cross-sectional diagram explaining the housing case which is formed depending to a width of the main circuit board.

By the way, as shown in FIG. 31, in the case where a housing case 150 for containing the dry battery for driving 21 with the outside diameter of about 14.5 [mm] and the main circuit board 43 with the width of 17.2 [mm], is formed depending on the width of the main circuit board 43, its outside diameter is about 19.2 [mm] even assuming that the thickness of the hosing case 150 is 1 [mm].

Figure 32:
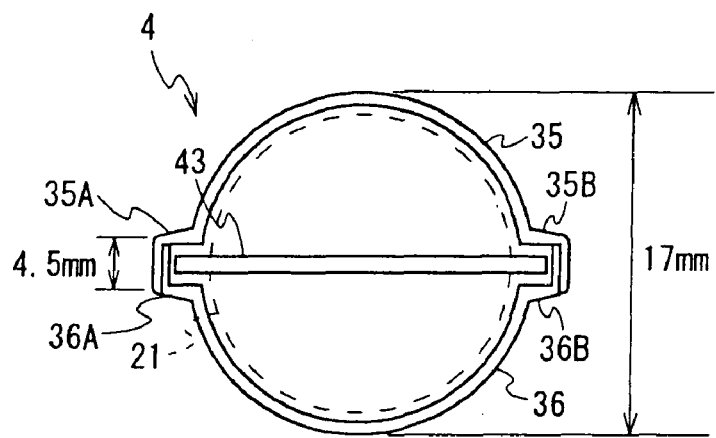
FIG. 32 is a schematic cross-sectional diagram explaining the housing case which is formed depending to the outside diameter of a dry battery for driving.

On the other hand, as apparent from FIG. 32, in the digital reproducing device 4 in this embodiment, the housing case 10 is formed depending on the outside diameter of the dry battery for driving 21, the outside diameter of the housing case 10 can be selected to be about 17 [mm], even taking the protection of the thickness of the housing case 10 from damage and Clearance between the dry battery for driving 21 and the housing case into consideration.

And, in the digital reproducing device 4, when projecting parts with the width of about 4.5 [mm] are formed in the housing case 10 by the ribs 35A and 35B, and 36A and 36B, the main circuit board 43 can be easily contained inside, which can remarkably downsize the housing case 10, as compared with the housing case 150 which is formed in a cylindrical shape depending on the width of the main circuit board 43.

In this connection, in the digital reproducing device 4, for example, when the facing projecting parts of the housing case 10 is colored in blue, and the cylindrical part of the housing case 10 is colored in gold brighter than the projecting parts, the cylindrical part is emphasized and the downsizing of the whole device is visibly emphasized.

According to forgoing constitution, the projecting parts having containing space are provided depending on the ends of the main circuit board 4 in the width direction, facing each other, in the longitudinal direction of the case on the circumferential plane of the cylindrical housing case 10, and the main circuit board 43 is contained between the inside of one projecting part and the inside of the other projecting part. Therefore, the main circuit board 43 which is wider than the outside diameter of the cylindrical case can be easily contained, thus making it possible to further downsize the digital reproducing device.

(4) Other Embodiments

The embodiment described above has dealt with the case where the strap fitting 27 is provided at the adjacent part between the jack holding part 25 and the Clip part 26 and at a predetermined position shifted from the center of gravity of the digital reproducing device 4, on one end side of the housing case 10. However, the present invention is not only limited to this but also the strap fitting 27 can be provided at another different position, if provided at a position which is a little Close to one end side or the other end side from the center of gravity of the housing case 10 containing the various circuit boards and the dry battery for driving 21. In this case, the posture of the dangled housing case 10 also can be kept.

Further, the embodiment described above has dealt with the case where the play/stop button 19 is provided on one plane of the housing case 10. However, the present invention is not only limited to this but also the play/stop button 19 can be provided on the circumference plane of one end side of the housing case 10. In this case, the manipulation of the play/stop button 19 can be also improved.

Furthermore, the embodiment described above has dealt with the case where the above-described plug 29 shown in FIG. 7 is inserted into the headphone jack 24. However, the present invention is not only limited to this but also a L-shaped plug can be inserted into the headphone jack 24. Inserting this plug into the headphone jack 24 can surely prevent the degradation in the manipulation of the play/stop button 19. If the L-shaped plug is the one to be inserted into the headphone jack 24, the headphone jack 24 can be provided in the housing case 10 in such a way that the axis of the plug inserting hole is approximately in parallel to the longitudinal direction of the case. In this case, the plug is formed like L-shape, so that the manipulation of the play/stop button 19 can be prevented from being degraded.

Furthermore, the embodiment described above has dealt with the case where the convex projecting parts are provided on the right and left sides of the housing case 10 with the robs 35A and 35B, and 36A and 36B. However, the present invention is not limited to this but also various shaped projecting parts can be provided, such as mountain-shaped projecting parts and projecting parts with waterdrop sections which are integrally formed in the housing case, as long as the main circuit board 43 can be contained.

Further, the embodiment described above has dealt with the case where the projecting parts are provided on the right and left sides of the housing case. However, the present invention is not limited to this and but also a projecting part can be provided on only one predetermined side of the housing case 10 and two or more projecting parts can be provided depending on the form and the number of the circuit board, as long as the circuit board can be contained.

Further, the embodiment described above has dealt with the case where the built-in semiconductor flash memory 80 is provided in the digital reproducing device 4 for recording/reproducing digital music contents C1. However, the present invention is not limited to this but also a removable recording medium, such as a memory stick (trade mark), an SD memory card (trade mark), a compact flash (trade mark), a smart media (trade mark), a multimedia card (trade mark), a micro drive (trade mark), an ID format (trade mark), and a thumb drive (trade mark), can be provided in the digital reproducing device 4 for recording/reproducing predetermined digital data such as the digital music contents C1.

Further, the embodiment described above has dealt with the case where the music data Dl compressed by a data compressing method such as ATRAC3 and MP3, is recorded in the semiconductor flash memory 80 of the digital reproducing device 4. However, the present invention is not limited to this but also the semiconductor flash memory 80 of the digital reproducing device 4 can store music data D1 compressed by another data compressing method such as MPEG-2AAC (MPEG-2 Advanced Audio Coding) (trade mark), QDesign Music Codec (trade mark), TwinVQ (Transform-Domein Weighted Interleave Vector Quantization) (trade mark), MS Audio (Microsoft Audio (or WMA: Windows Media Audio)) (trade mark) and Oggvorbis (trade mark)

Furthermore, the embodiment described above has dealt with the case where the portable equipment according to this invention is applied to the digital reproducing device 4 described in FIG. 3. However, the present invention is not only limited to this but also various kinds of portable equipment can be widely used, such as a disc recording medium, a portable recording and/or reproducing device using a tape recording medium, a portable recording and/or reproducing device in which a memory card is loaded removably, a portable terminal such as a portable telephone and a PDA (Personal Digital Assistance), and a head-mount display.

Further, the embodiment described above has dealt with the case where the DSP 82 is applied as a reproducing means for reproducing digital data read out from a predetermined recording medium recording the digital data. However, the present invention is not limited to this but also various kinds of reproducing means can be widely used, as long as digital data read out from a predetermined recording medium recording the digital data can be reproduced.

Further, the embodiment described above has dealt with the case where the play/stop button 19 is used as the manipulating means for making an instruction of reproducing digital data recorded in a recording medium. However, the present invention is not limited to this but also various kinds of manipulating means can be widely used, like a manipulating means which can designates various operation commands such as stop, forwarding, and rewinding, as well as reproducing, as long as the instruction can be made to reproduce digital data recorded in a recording medium.

Further, the embodiment described above has dealt with the case where the CPU 78 is used as the control means for reading digital data from a recording medium and sending it to the reproducing means, in accordance with a reproduction instruction which is input with the manipulating means, and for controlling the reproducing means to reproduce the digital data. However, the present invention is not limited to this but also various kinds of control means such as a micro computer can be widely used, as long as digital data can be read out from a recording medium and output to a reproducing means, in accordance with an reproduction instruction which is input with a manipulating means, and a reproducing means can be controlled to reproduce the digital data.

Furthermore, the embodiment described above has dealt with the case where the approximately cylindrical housing case 10 formed of synthetic resin of PC resin and ABS resin is applied as a cylindrical housing case for containing the reproducing means and the controlling means. However, the present invention is not only limited to this but also a housing case formed of other various material and formed in various shapes, like a rectangular case and a box, can be widely used, as long as the case is cylindrical and can contain the reproducing means and the control means.

Furthermore, the embodiment described above has dealt with the case where the circular strap fitting 27 is provided on one end side in the longitudinal direction of the case as a strap attaching means for attaching a predetermined strap thereto. However, the present invention is not only limited to this but also other various kinds of attaching means can be widely used, as long as it is provided on one end side in the longitudinal direction of the case and can allow a predetermined strap to be attached to.

Furthermore, the embodiment described above has dealt with the case where the band-type dangling strap 31 described above in FIG. 5 is used as a strap. However, the present invention is not only limited to this but also other various straps, such as a strap extremely shorter than the dangling strap 31 and a chain strap made of metal, can be widely used. Therefore, the device can be used not only by dangling from user's neck but also by dangling from waistbelt or breast pocket.

Further, the embodiment described above has dealt with the case where the headphone jack 24 is applied as a jack having a terminal, which is provided on one end side in the longitudinal direction of the case for inserting the external connection plug therein and outputting analog signals obtained from the digital-to-analog converting means, to the inserted connection plug. However, the present invention is not limited to this and other various kinds of jack can be used, such as a plug provided in an earphone cord and a plug provided in a code for inputting and outputting predetermined data, as long as it has a terminal which is provided on one end side in the longitudinal direction of the case for inserting an external plug therein and outputting analog signals obtained from the digital-to-analog converting means to the inserted connection plug.

Furthermore, the embodiment described above has dealt with the case where the rectangular main circuit board 43 described in FIGS. 15(A) and 15(B) is used as a circuit board which is contained in the housing case with loading an Integrated Circuit package consisting at least a part of the control means. However, the present invention is not limited to this and circuit boards having other various forms can be widely used, such as a disc circuit board and a trapezoid circuit board like the sub circuit board 42.

Furthermore, the embodiment described above has dealt with the case where the projecting parts composed of the ribs 35A and 35B, and 36A and 36B fitted to each other are applied as projecting parts, which are projected from parts of the housing case in accordance with the form of the circuit board for containing a part of the circuit board. However, the present invention is not limited to this and projecting parts having other various forms and structures can be widely applied, as long as they are projected from parts of the housing case in accordance with the form of the circuit board for containing a part of the circuit board.

Furthermore, the embodiment described above has dealt with the case where the C1ip 26 is applied as a C1ip which is provided on one end side in the longitudinal direction of the case for attaching the housing case to a user's body, C1othes or belongings. However, the present invention is not limited to this but also other kinds of C1ips can be widely applied, as long as it can be provided on one end side in the longitudinal direction of the case for attaching the housing case to a user's body, C1othes, and belongings.

Furthermore, the embodiment described above has dealt with the case where the USB connector 83 is applied as an interface for taking in the digital data transferred from the outside. However, the present invention is not limited to this but also other kinds of interfaces can be widely applied, as long as it can take in digital data which is transferred from outside.

Furthermore, the embodiment described above has dealt with the case where the flash memory controller 77 which records the music data D1 to the semiconductor flash memory 80 under the control of the CPU 78, as a recording means for recording digital data taken in by the interface, to a recording medium. However, the present invention is not limited to this but also other various kinds of recording means can be widely applied, as long as it can record digital data which is taken in by an interface, to a recording medium.

Here, the configuration of the dangling strap 31 described in FIG. 5 will be described.

Figure 33:
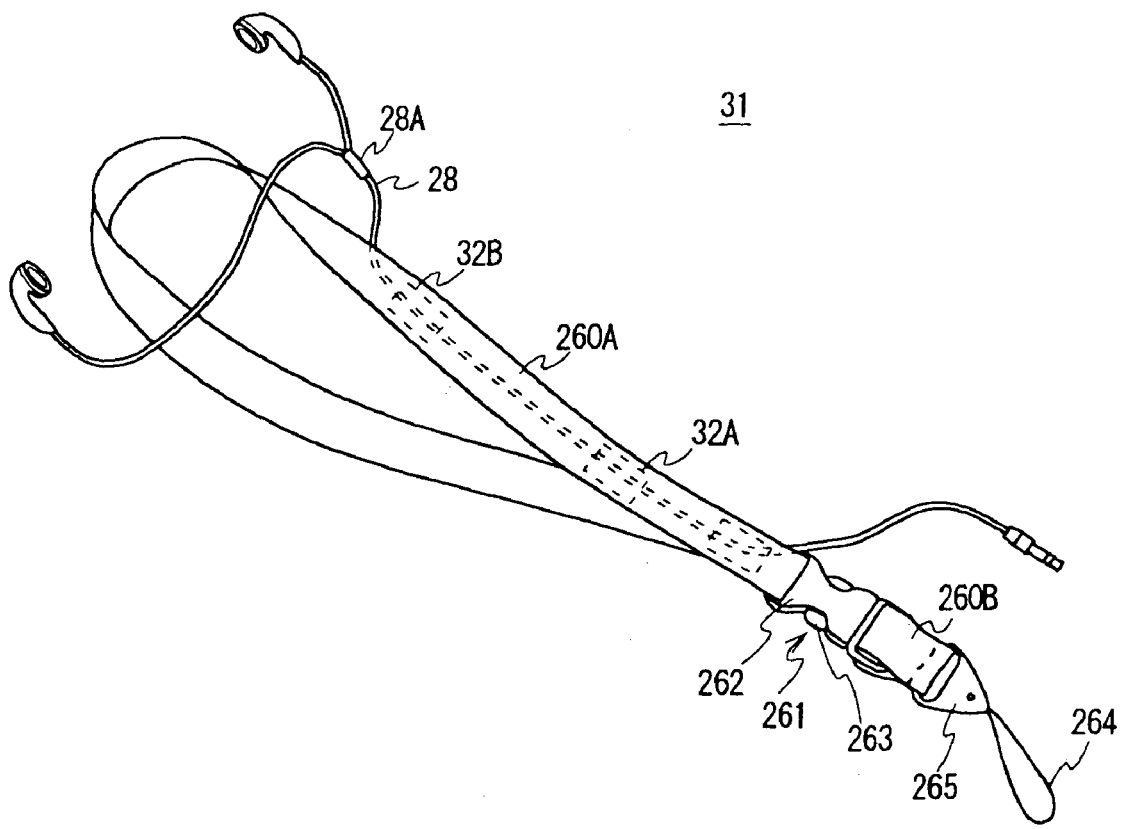
FIG. 33 is a schematic diagram showing the form of the strap.

That is, as shown in FIG. 33, the strap 31 is made of a Cloth band 260A and Cloth band 260B having a predetermined width, and its length is selected so that the digital reproducing device 4 (not shown) is in front of a user's breast when he dangles it from his neck.

In this strap 31, a detachable connecting part 261 of a side release structure is attached to one end of the band 260A and a short band 260B is attached to the connecting part 261. Therefore, the connecting part 261 allows the band 260A and the band 260B to be connected/removed to/from each other easily.

Figure 34:
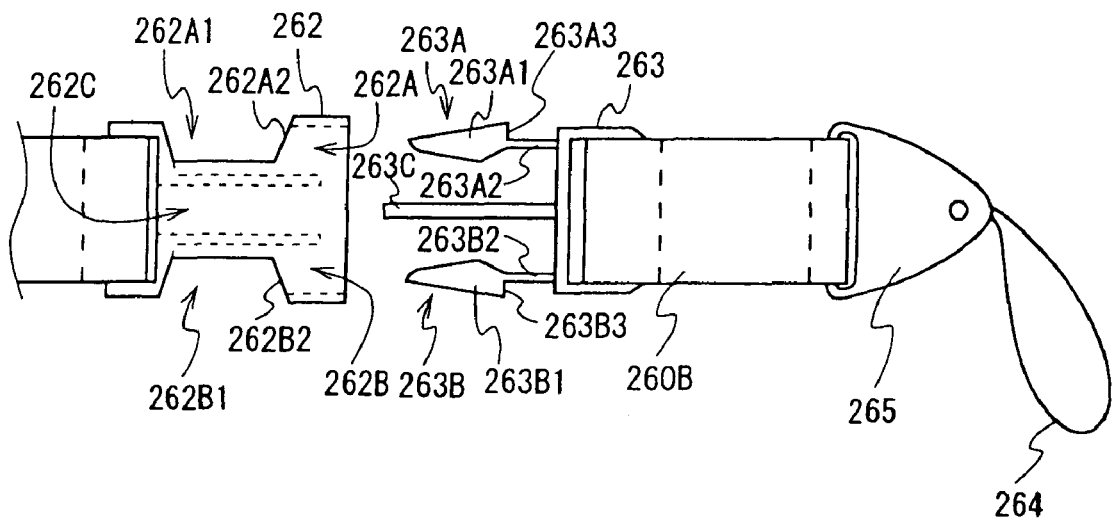
FIG. 34 is a schematic diagram showing the configuration of a connecting part in the strap.

The connecting part 261 is composed of a female-type part 262 and a male-type part 263, as shown in FIG. 34, and a holder 265 with a string 264 of a predetermined length is attached to the male-type part 263 with the band 260B. Note that, the string 264 of the holder 265 is used to be connected to the strap fitting 27 of the digital reproducing device 4.

Further, the male-type part 263 inCludes two fitting projecting parts 263A and 263B and a center guide projecting part 263C. The fitting projecting parts 263A and 263B have approximately triangle tips 263A1 and 263B1, respectively, and the tips 263A1 and 263B1 are formed integrally with supporting shafts 263A2 and 263B2 which are little flexible.

Provided in the female-type part 262 are a guiding hole 262C for guiding a guide projecting part 263C of the male-type part 263 and guiding holes 262A and 262B for guiding the fitting projecting parts 263A and 263B of the male-type part 263.

In addition, notches 262A1 and 262B1 of a predetermined shape are provided on both sides of the female-type part 262, thereby the tips 263A1 and 263B1 are projected from the corresponding notches 262A1 and 262B1 when the fitting projecting parts 263A and 263B of the male-type part 263 is inserted into the guiding holes 262A and 262B.

As a result, in the connecting part 261, the female-type part 262 and the male-type part 263 are connected to each other, and when the tips 263A1 and 263B1 of the fitting projecting parts 263A and 263B are projected from the notches 262A1 and 26231, jaw parts 262A3 and 263B3 of the tips 263A1 and 263B1 are hooked on and connected to the shoulder parts 262A2 and 262B2 of the notches 262A1 and 262B1.

In this connection, when the tips 263A1 and 263B1 of the fitting projecting parts 263A and 263B, which are projected from the notches 262A1 and 262B1, are pushed from the both sides, the supporting shafts 263A2 and 263B2 of the fitting projecting parts 263A and 263B are moved inside and then, the male-type part 263 can be pulled out from the female type-part 262 easily, and as a result, the connection is released.

Thus, after connecting the strap 31 to the strap fitting 27 of the digital reproducing device 4 with the string 264 of the holder 265, the digital reproducing device 4 can be easily separated from the strap 31, by releasing the connection at the connecting part 261 with just one push, without releasing the string 264 from the strap fitting 27.

Figure 35:
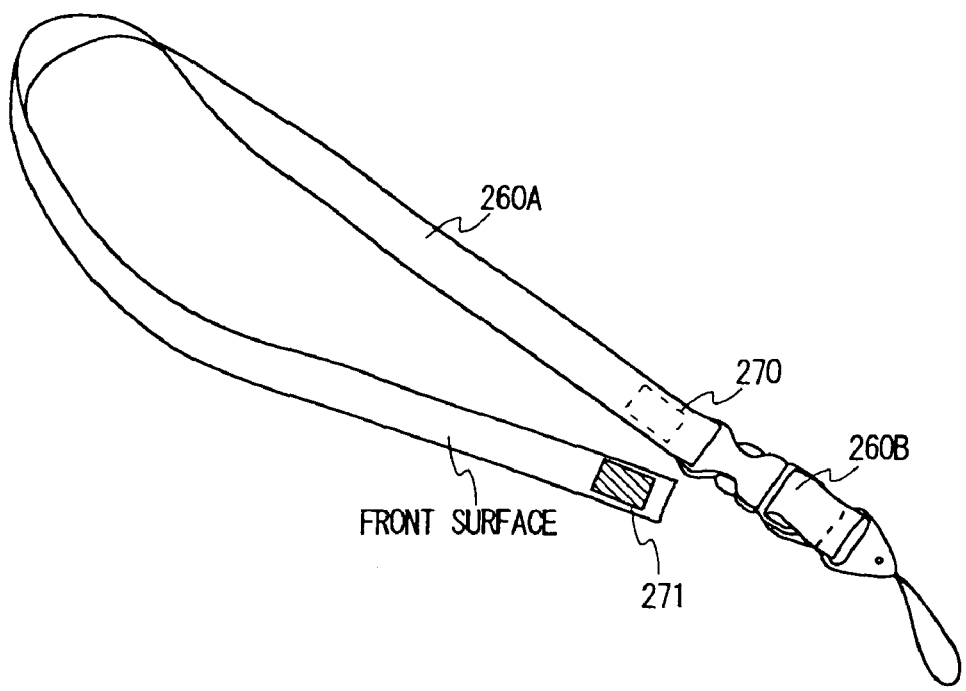
FIG. 35 is a schematic diagram showing a sticking tape which is attached to a part of a strap string.

In addition, as shown in FIG. 35, in the strap 31, a nylon sticking tape (that is, a magic tape) 270 is attached on one end of the back plane of the band 260A and a sticking tape 271 of the approximately same shape and size as the sticking tape 270 is attached on the other end of the front plane of the band 260A.

In the strap 31, the sticking tape 270, which is attached on one end of the back plane of the band 260A, and the sticking tape 271, which is attached on the other end of the front plane of the band 260A, are stuck to each other, thereby the band 260A are not twisted in front of a breast when dangling the strap from the user's neck, and the strap 31 the plane of the band 260A always faces outside. Therefore, designs and logos written on the surface of the band 260A are not hidden and the strap 31 looks much nicer.

In addition, in the strap 31, since one end and the other end of the band 260A are just stuck to each other with the sticking tapes 270 and 271, they can be easy disconnected by apply little power. Therefore, even if the band 260A are pulled in a certain accident, the sticking tapes 270 and 271 are immediately separated from each other, so that the strap 31 does not strangle the user's neck.

Further, in the strap 31 (FIG. 33), guiding holes 32A and 32B are provided on the back plane of the band 260A to pass and hold the headphone code 28 of the headphone 5 connected to the digital reproducing device 4, one guiding hole 32A is fixed near the connecting part 261 and the other guiding hole 32B is fixed at the position which is away by a predetermined distance.

Figure 36:
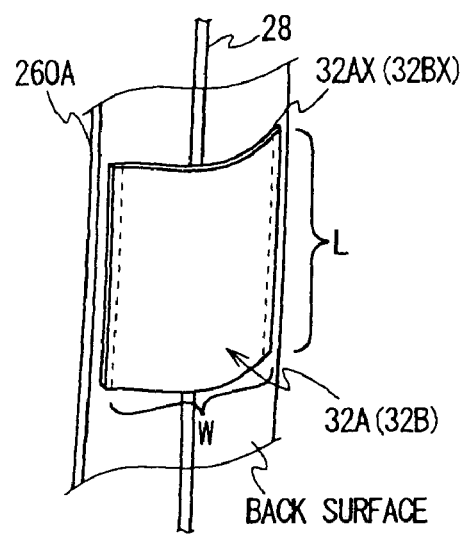
FIG. 36 is a schematic diagram showing the configuration of a guide which is provided on the strap string.

The guiding holes 32A and 32B are, as shown in FIG. 36, formed in such a way that Cloth 32AX (32BX) of the length L and the slight shorter width W than the band 260A is sawed on the back plane of the band 260A in the longitudinal direction.

Therefore, after passing the headphone code 28 into the guiding holes 32A and 32B sawed on the back plane of the band 260A, the sticking tape 270 attached to one end of the back plane of the band 260A and the sticking tape 271 attached to the other end of the front plane of the band 260A, thereby a ring for dandling from the user's neck is formed and the headphone cord 28 of the headphone 5 is integrated with the band 260A.

In addition, the guiding hole 32B is arranged so as to be near a forked part 28A of the headphone code 28 when the strap 31 (FIG. 33) is dangled from the user's neck, therefore only a short headphone code 28 exists at the user's neck and thus, annoyance of the headphone code 28 can be further dissolved.

In the foregoing constitution, in the strap 31, the guiding holes 32A and 32B are provided on the back plane of the band 260A, and the headphone code 28 of the headphone 5 is passed into the guiding holes 32A and 32B, which integrates the headphone code 28 of the headphone 5 with the band 260A.

Therefore, when the strap 31 is dangled from the user's neck by tying the string 264 of the holder 265 to the strap fitting 27 of the digital reproducing device 4, the headphone code 28 of the headphone 5 connected to the digital reproducing device 4 can be surely prevented from becoming tangled with the band 260A, thus its usability can be improved.

In addition, in the strap 31, since the headphone code 28 of the headphone 5 is positioned on the back plane of the band 260A, only front surface of the band 260A having designs and logos written thereon are visible, thus it becomes more fashionable and also looks much nicer.

Further, in the strap 31, since the sticking tape 270 attached to one end of the back plane of the band 260A are stuck to the sticking tape 271 attached to the other end of the front plane of the band 260A, the band 260A are not twisted in front of a breast. Therefore, the band 260A does not make the user feel uncomfortable, when the digital reproducing device 4 is dangled from his neck.

According to the foregoing constitution, the guiding holes 32A and 32B are provided on the back plane of the band 260A in the strap 31, and the headphone code 28 of the headphone 5 is passed through the guiding holes 32A and 32B, the head phone code 28 of the headphone 5 are integrated with the band 260A, and the headphone code 28 can be surely prevented from becoming tangled with the band 260A, thus its usability can be remarkably improved and the user smartly uses them.

Figure 37:
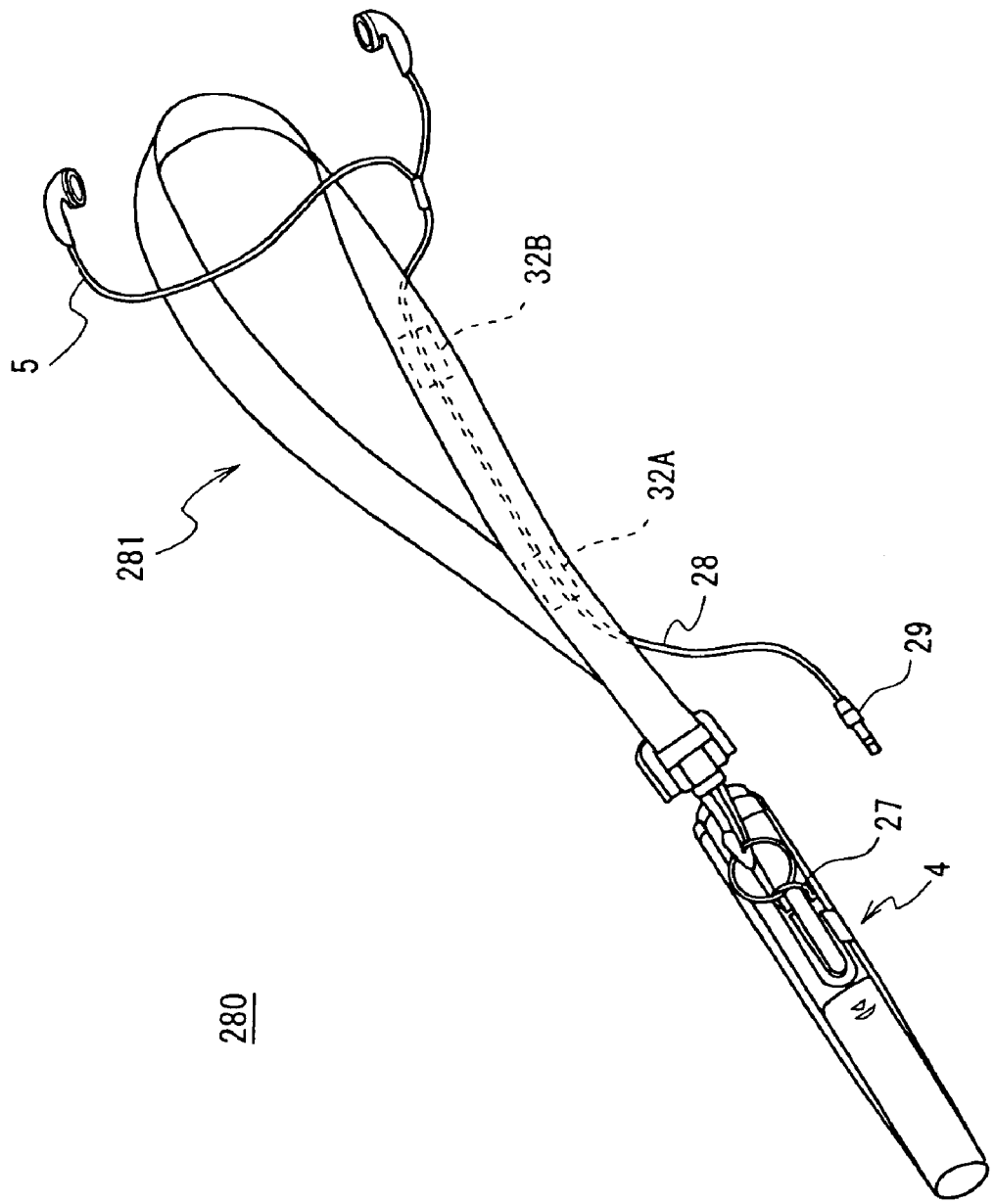
FIG. 37 is a schematic diagram showing the configuration of the whole digital reproducing device to which the dangling strap in another embodiment.

Next, a dangling strap in other embodiments will be described. In FIG. 37 in which the same reference numerals are applied to parts corresponding to FIG. 5, referent numeral 280 shows the digital reproducing device 4 to which a dangling strap 281 is attached, as a whole, in another embodiment. The headphone 5 is connected to the digital reproducing device 4 with the headphone code 28.

Figure 38:
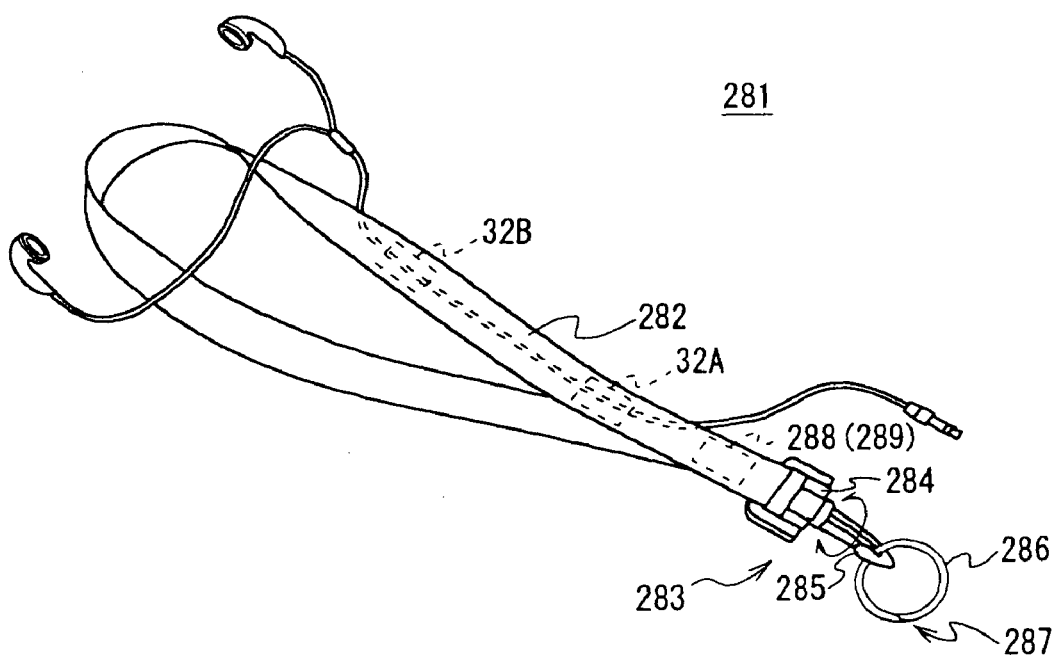
FIG. 38 is a schematic diagram showing the dangling strap in another embodiment.

Similarly to the strap 31 described in FIG. 33, the dangling strap 281, as shown in FIG. 38, is a soft Cloth band 282 of a predetermined width, its length is selected so that the digital reproducing device 4 (not shown) is placed in front of a breast when the device 4 is dangled from the user's neck.

To this strap 281, a connecting part 283 is attached to connect one tip of the band 282 to the digital reproducing device 4. A hook 285 which can rotate with the axis of the holding part 284 as a center and also can rotate in the direction showed by the arrow is attached to this connecting part 283, and the ring 286 is attached to the hook 285.

The ring 286 has a spring constitution, is formed so as to be divided at a predetermined cut position 287 by applying external power to separate this part from each other, and can be connected to the strap fitting 27 of the digital reproducing device 4.

Therefore, the digital reproducing device 4 can be dangled using the ring 286 of the strap 281, and the connecting part 283 can be immediately separated from the digital reproducing device.

In addition, similarly to the strap 31 described in the aforementioned embodiment, the sticking tape 288 is attached on one end of the back plane of the band 282 and the sticking tape 289 of the approximately same shape and same size as the sticking tape 288, is attached to the other end of the face plane of the band 282.

Therefore, in the strap 281, when the sticking tapes 288 and 289 are stuck to each other, the band 282 is not twisted, and the front surface of the band 282 always faces outside. Therefore, designs and logos written on the front surface of the band 282 is not hidden and the strap 281 looks much nicer.

In this case, also, since one end and the other end of the band 282 are just stuck to each other with the sticking tapes 288 and 289, they can be disconnected by apply little power so as to separate them. Therefore, when the band 282 is pulled in a certain accident, the sticking tapes 288 and 289 are separated from each other, so that the strap 281 does not strangle the user's neck.

In addition, similarly to the strap 31 in the aforementioned embodiments, in the strap 281, the guiding holes 32A and 32B are provided to pass the headphone code 28 of the head-phone 5 connected to the digital reproducing device 4 through, on the back plane of the band 282.

Therefore, after passing the headphone code 28 of the headphone 5 through the guiding holes 32A and 32B, the sticking tape 288, which is attached to one end of the back plane of the band 282, is stuck to the sticking tape 289, which is stuck on the other end of the front plane of the band 282. Therefore a ring for dangling from the user's neck is formed and the headphone code 28 of the headphone 5 is integrated with the band 282.

In the foregoing constitution, in the strap 281, the guiding holes 32A and 32B are provided on the back plane of the band 282, and the headphone code 28 of the headphone 5 is passed through the guiding holes 32A and 32B, thereby the headphone code 28 of the headphone 5 can be integrated with the band 282.

Further, in the strap 281, the ring 286 which has the spring constitution so as to be separated at the predetermined position 287 when power is applied so as to separate it, is connected to the strap fitting 27 of the digital reproducing device 4, thereby the digital reproducing device 4 can be immediately separated from the connecting part 283.

In this case, in the strap 281, only the digital reproducing device 4 can be separated from the strap 281 itself, different from the strap 31 in the first embodiment where the digital reproducing device 4 is separated together with the male-type part 263 of the connecting part 261.

In the foregoing constitution, in the strap 281, the guiding holes 32A and 32B are provided on the back plane of the band 282, the headphone code 28 of the headphone 5 is passed through the guiding holes 32A and 32B to integrate the headphone code 28 of the headphone code 5 with the band 282, thereby the headphone code 28 can be surely prevented from becoming tangled with the band 282, and its usability can be remarkably improved for the user.

Figure 39:
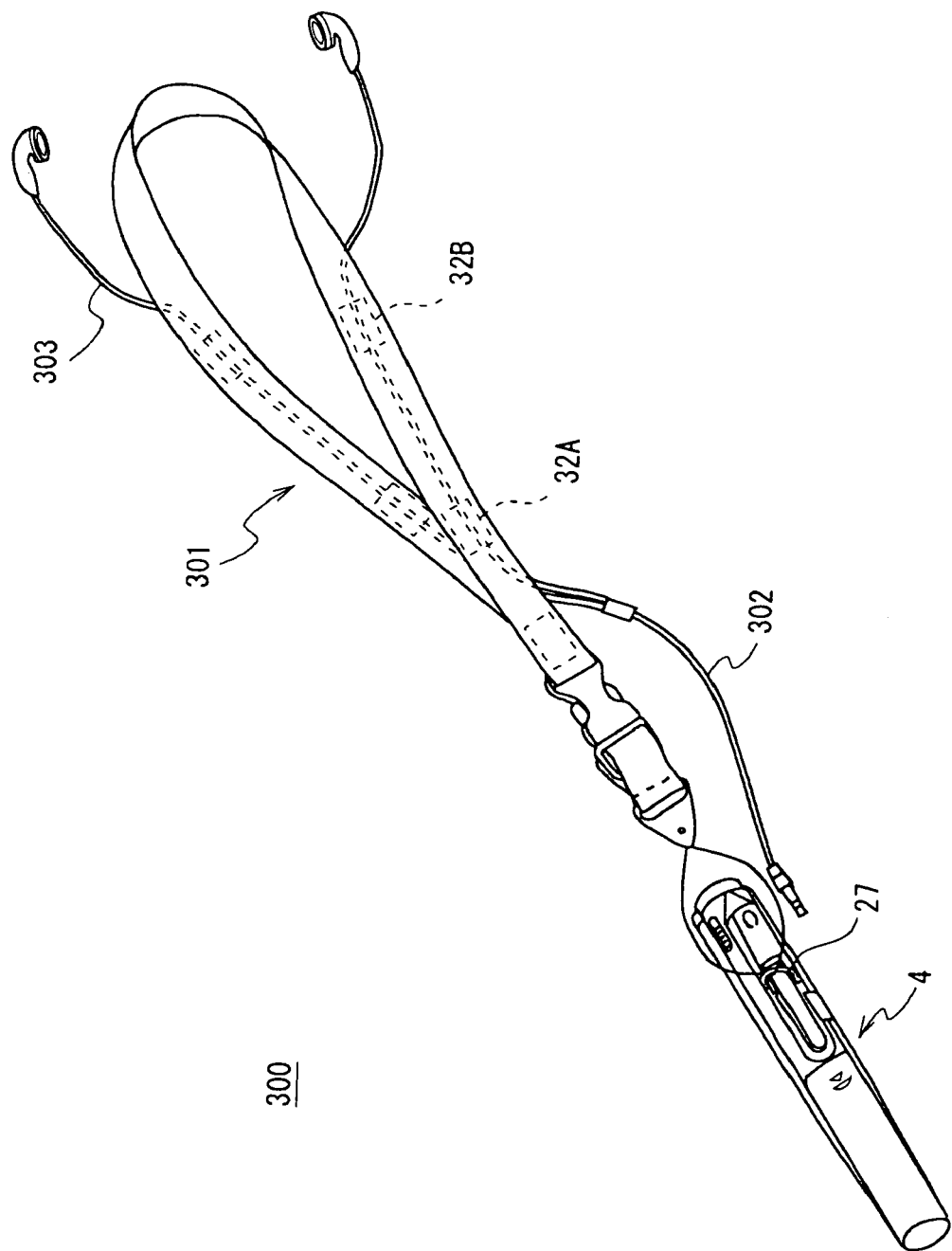
FIG. 39 is a schematic diagram showing the configuration of the whole digital reproducing device having the dangling strap attached in another embodiment.

In FIG. 39 in which the reference numerals are applied to parts corresponding to those in FIG. 5, reference numeral 300 shows a digital reproducing device 4 to which the dangling strap 301 according to another embodiment is attached. To the digital reproducing device 4, the headphone 303 is connected with a headphone code 302 different from the headphone code 28 of the headphone 5 described in FIG. 5.

Figure 40:
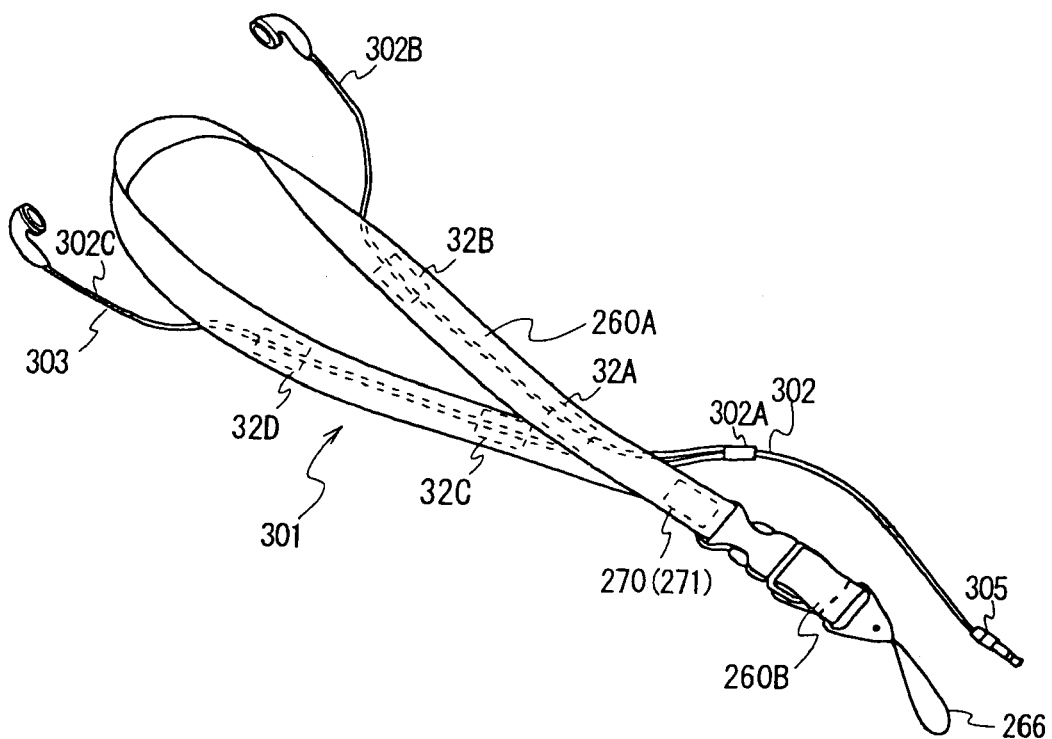
FIG. 40 is a schematic diagram showing the configuration of dangling strap in another embodiment.

In this case, as shown in FIG. 40 in which the same reference numerals are applied to parts corresponding to those in FIG. 33, the dangling strap 301 comprises a Cloth band 260A and a band 260B having a predetermined width, similarly to the strap 31 in the aforementioned embodiment, and its length is selected so that the digital reproducing device 4 (not shown) is positioned in front of a breast when being dangled from the user's neck.

Further, a forked part 302A of the headphone code 302 is provided near the plug 305, and a left headphone code 302B and a right headphone code 302C have the same length.

Therefore, the guiding holes 32A and 32B are provided at predetermined positions on the back plane of the band 260A, in accordance with the left headphone code 302 of the headphone 303, and the guiding holes 32C and 32D are provided at predetermined positions on the back plane of the band 260A, in accordance with the right headphone code 302C.

Therefore, the left headphone code 302B is passed through one guiding holes 32A and 32B and the right headphone code 302C is passed through the other guiding holes 32C and 32D, which integrates the left headphone code 302B and the right headphone code 302C of the headphone 303 with the band 260A.

Further, similarly to the strap 31 in the aforementioned embodiment, in the strap 301, the sticking tape 270 attached to one end of the back plane of the band 260A is stuck to the sticking tape 271 attached to the other end of the front plane of the band 260A, thereby the band 260A are not twisted in front of the breast. Thus, dangling the digital reproducing device 4 from the user's neck does not make the user feel uncomfortable.

In the foregoing constitution, in the strap 301, the guiding holes 32A, 32B and 32C, 32D are provided on the back plane of the band 260A, and the left headphone code 302B and the right headphone code 302C are passed through the guiding holes 32A, 32B and 32C, 32D, which integrates the band 260A with the left headphone code 302B and the right headphone code 302C of the headphone 303.

Thereby, while dangling the digital reproducing device 4 with the strap 301, the left headphone code 302B and the right headphone code 302C of the headphone 303 connected to the digital reproducing device 4 can be prevented from becoming tangled with the band 260A, thus making it possible to improve the its usability for a user.

In this case, in the strap 301, since the left headphone code 302B and the right headphone code 302C of the headphone 303 are laid on the back plane of the band 260A, only the front surface having designs and logos written thereon, of the band 260A can be visible, thus it looks much nicer and is more fashionable.

Further, in the strap 301, as to the headphone 303 comprising the left headphone code 302B and the right headphone code 302C which have the same length, the left headphone code 302B and the headphone code 302C are each integrated with the band 260A, thereby the right headphone code 302 does not pass in front of the lower part of the user's neck, which can allow the user to use it smartly.

In the strap according to the aforementioned constitution, a total of four guiding holes 32A, 32B and 32C, 32D are provided on the back plane of the band 260A, and the left headphone code 302B and the right headphone code 302C of the headphone 303 are passed through the guiding holes 32A, 32B and 32C, 32D, respectively. Thereby, the left headphone code 302B and the right headphone code 302C can be integrated with the band 260A, and they are prevented from becoming tangled with the band 260A, which can improve the usability and the user can use comfortably.

Figure 41:
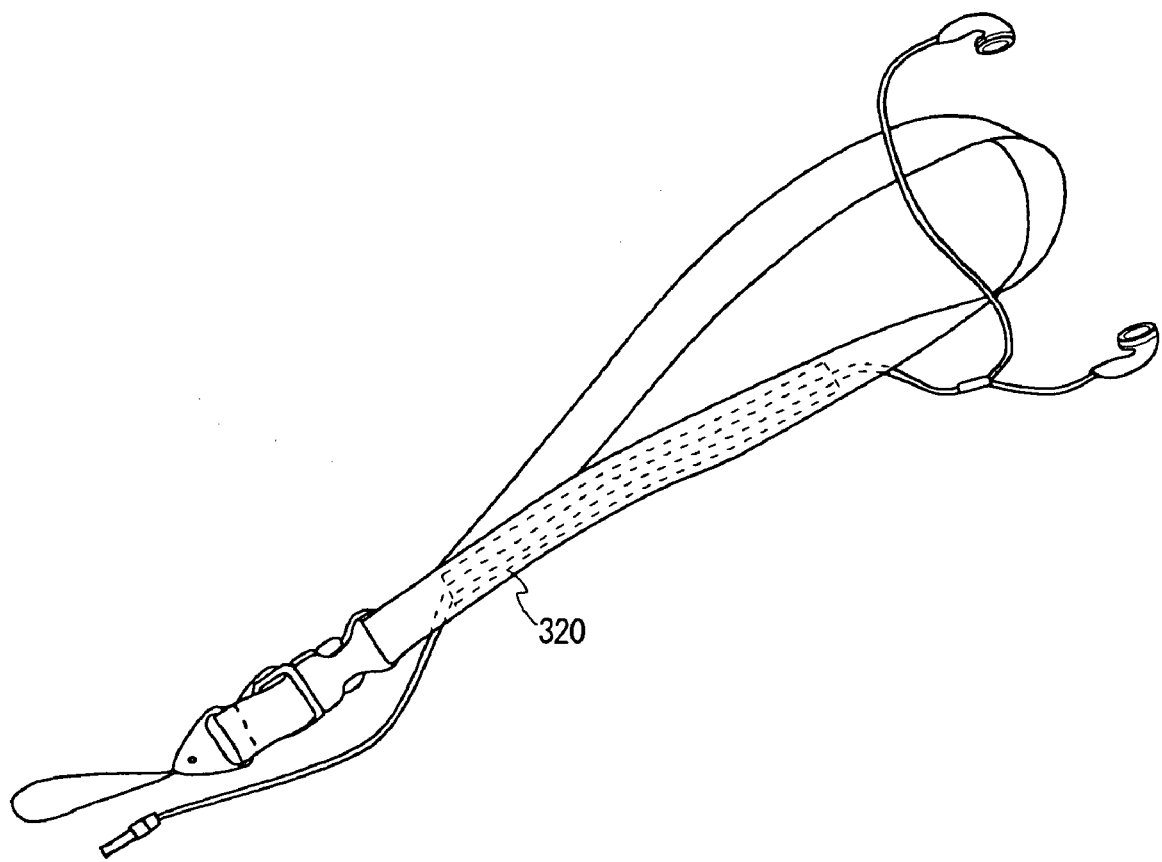
FIG. 41 is a schematic diagram showing the configuration of a guide in another embodiment.

Note that, the foregoing embodiment has dealt with the case where the Cloths 32AX and 32BX of the width W are sawed on the back plane of the band 260A, 282. However, the present invention is not limited to this but also as shown in FIG. 41, one long cloth in the longitudinal direction can be sawed on the back plane of the band 260A, 282 to form the guiding hole 320. In this case, the strap 31, 281, 301, the headphone code 28 of the headphone 5, and the left headphone code 302 and the right headphone code 302C of the headphone 303 are integrated with each other more firmly.

Figure 42:
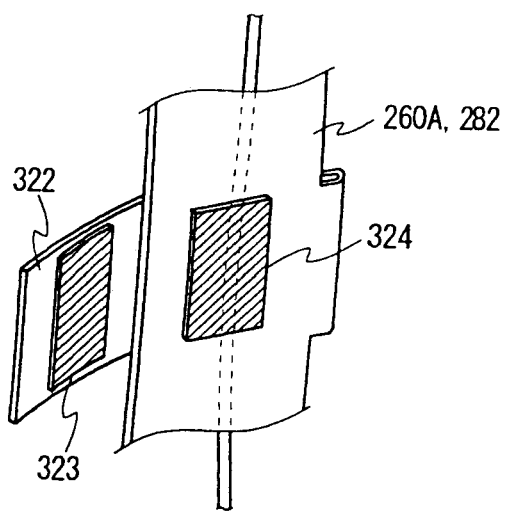
FIG. 42 is a schematic diagram showing the configuration of a guide in another embodiment.
Figure 43:
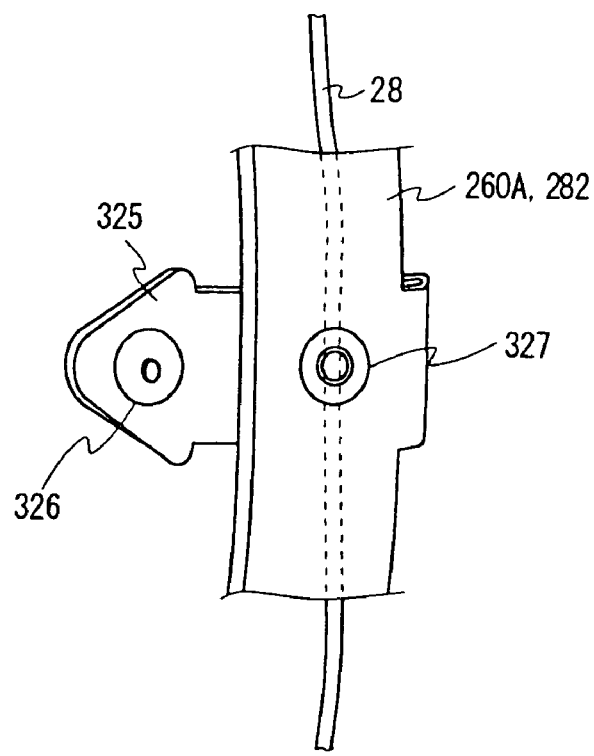
FIG. 43 is a schematic diagram showing the configuration of a guide in another embodiment.

In addition, as shown in FIG. 42, the sticking tapes 323 and 324 can be stuck to each other after bandaging the code with a Cloth 322 which is formed integrally with the band 260, 282 under such a situation the headphone code 28, the left headphone code 302B and the right headphone code 302C are laid on the back plane of the band 260A and 282. Furthermore, as shown in FIG. 43, after bandaging the code with a Cloth 325 which is formed integrally with the band 260A, 282, under such a situation that the headphone code 28, the left headphone code 302B and the right headphone code 302C are laid on the back plane of the band 260A, a male-type part 326 and a female-type part 327 of a snap hook can be hooked for holding the code 28.

Further, the foregoing embodiment has dealt with the case where one end and the other end of the band 260A, 282 are detachably stuck to each other with the sticking tapes 270 and 271. However, the present invention is not limited to this but also they can be fixed to each other so as not to twist.

Further, the foregoing embodiment has dealt with the case where the band 260A and 282 are stuck with the sticking tapes 270, 271 and 288, 289 so as not to twist. However, the present invention is not limited to this and the band can be twisted and stuck.

Figure 44:
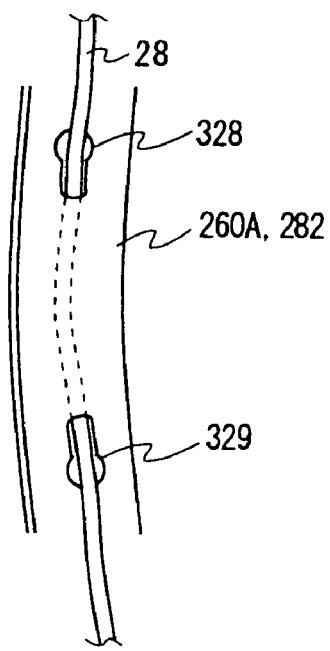
FIG. 44 is a schematic diagram showing the configuration of a guide in another embodiment.

Further, as shown in FIG. 44, the headphone code 28, the left headphone code 302B and the right headphone code 302C can be integrated with the band 260A, 282, by passing the headphone code 28, the left headphone code 302B and the right headphone code 302C through the holes 328 and 329 of a predetermined forms which are provided on the back plane of the band 260A, 282 to be passed inside the band 260A and 282.

Figure 45:
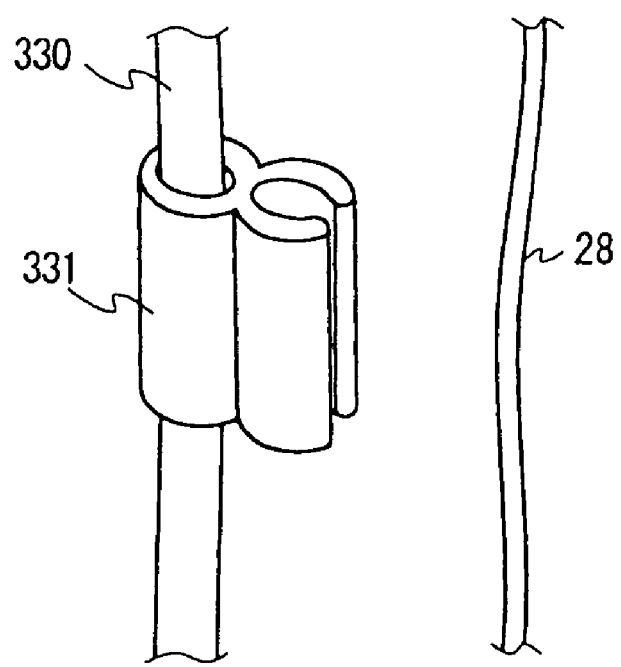
FIG. 45 is a schematic diagram showing the configuration of the dangling strap in another embodiment.

Further, the foregoing embodiment has dealt with the case where the bands 260A and 282, and the straps 31 and 301 are provided. However, the present invention is not limited to this but also, as shown in FIG. 45, a strap string 330 can be used as the strap 31, 301. In this case, the strap string 330 is attached with sticking tapes which are provided on one end and the other end of the front plane of the strap string 330, and the headphone code 28 of the headphone 5, the left headphone code 302B and the right headphone code 302C of the headphone 303 are integrally held using a code holder 311 which is fixed at a predetermined position.

Further, the foregoing embodiment has dealt with the case where the length of the band 260A, 282 of the strap 31 and 301 is selected so that the digital reproducing device 4 is positioned in front of the breast when being dangled from a user's neck. However, the present invention is not limited to this but also the length can be freely adjusted by attaching a length adjusting means to the band 260A, 282.

Further, the foregoing embodiment has dealt with the case where Cloth is used as material for the band 260A, 260B and 282 of the strap 31, 301. However, the present invention is not limited to this but also a metal chain or the like can be used.

Furthermore, the foregoing embodiment has dealt with the case where the digital reproducing device 4 is attached to the strap 31, 301. However, the present invention is not limited to this but also a portable radio, a portable telephone to which a headphone is attached to use without hands, a head-mount display and the like can be attached.

INDUSTRIAL APPLICABILITY

The present invention can be applied to a portable recording and/or reproducing device, such as a portable music reproducing device and a portable terminal including a portable telephone and PDA, for recording and/or reproducing digital data to/from a built-in recording medium or a removable recording medium.

The invention claimed is:

1. A portable player comprising: a storage medium for storing digital data; a reproducing unit to reproduce the digital data stored in the storage medium; a housing case containing said storage medium and said reproducing unit; a clip to attach said portable player, said clip being arranged on a first side of said housing case; and the housing case having a hold switch and at least one operating button disposed on its surface, wherein the hold switch, when engaged, locks the current state of the at least one operating button that is active at the time when the hold switch is engaged, the hold switch being arranged on a second side of the housing case.

2. The portable player according to claim 1, wherein the digital data is stored as MP3 format data.

3. The portable player according to claim 1, further comprising a display for displaying supplemental information, the display being located on a third side of said housing case.

4. The portable player according to claim 1, wherein the clip is usable to attach the portable player to a user's clothing.

5. The portable player according to claim 1 further comprising:
a manipulating unit operable so as to change a state of operation of the portable player, wherein the manipulating unit is arranged on a third side of the housing case which is opposite to the first side of the housing case on which the clip is arranged.

6. The portable player according to claim 5, wherein said second manipulating unit includes at least a number of buttons for controlling volume, a fast forward operation, and a rewind operation.

7. The portable player according to claim 3, wherein said display displays connection information as the supplemental information when said portable player is connected to a computer.

8. The portable player according to claim 1, further comprising a display for displaying connection information when said portable player is connected to a computer.

9. The portable player according to claim 1, wherein the first side of the housing case on which the clip is arranged is adjacent to the second side of the housing case on which the hold switch is arranged.

10. The portable player according to claim 1, a connector to enable connection of the portable player to a headphone unit for listening to analog audio obtained by reproducing the digital data, wherein the connector is arranged on the housing case.

11. The portable player according to claim 10, wherein the first side of the housing case on which the clip is arranged is adjacent to the second side of the housing case on which the hold switch is arranged, and wherein the connector to enable connection to the headphone unit is arranged on a side of the housing case which is adjacent to the second side of the housing case on which the hold switch is arranged.

12. The portable player according to claim 10, wherein the connector to enable connection to the headphone unit is arranged on the first side of the housing case on which the clip is arranged.

13. The portable player according to claim 3, wherein the first side and the third side of the housing case on which the clip and the manipulating unit, respectively, are arranged are perpendicular to the second side of the housing case on which the hold switch is arranged.

14. The portable player according to claim 3, wherein the third side of the housing case is opposite the first side of the housing case.

15. The portable player according to claim 1, wherein the hold switch is a slide switch.

* * * * *